United States Patent
Srivastava et al.

(10) Patent No.: US 11,714,796 B1
(45) Date of Patent: Aug. 1, 2023

(54) DATA RECALCULATION AND LIVELINESS IN APPLICATIONS

(71) Applicant: Amazon Technologies, Inc., Seattle, WA (US)

(72) Inventors: Anupam Srivastava, Vancouver (CA); Adrian Kwok, Richmond (CA); Venkata Rao Pedapati, Burnaby (CA); Helbert Fonseca Maich, Britannia Beach (CA)

(73) Assignee: Amazon Technologies, Inc, Seattle, WA (US)

( * ) Notice: Subject to any disclaimer, the term of this patent is extended or adjusted under 35 U.S.C. 154(b) by 170 days.

(21) Appl. No.: 17/090,755

(22) Filed: Nov. 5, 2020

(51) Int. Cl.
*G06F 16/22* (2019.01)
*G06F 16/2455* (2019.01)
*G06F 16/901* (2019.01)
*G06F 16/25* (2019.01)
*G06F 40/18* (2020.01)

(52) U.S. Cl.
CPC .... *G06F 16/2282* (2019.01); *G06F 16/24565* (2019.01); *G06F 16/252* (2019.01); *G06F 16/9024* (2019.01); *G06F 40/18* (2020.01)

(58) Field of Classification Search
None
See application file for complete search history.

(56) References Cited

U.S. PATENT DOCUMENTS

| | | | |
|---|---|---|---|
| 5,276,607 A | * | 1/1994 | Harris .......... G06Q 40/123 715/219 |
| 8,516,008 B1 | | 8/2013 | Marquardt |
| 8,682,925 B1 | | 3/2014 | Marquardt |
| 9,619,210 B2 | | 4/2017 | Kent |
| 10,546,001 B1 | | 1/2020 | Nguyen |
| 10,705,805 B1 | | 7/2020 | Bosworth et al. |
| 10,901,990 B1 | | 1/2021 | Vogelsgesang |
| 10,977,211 B2 | | 4/2021 | Nag |
| 11,221,994 B2 | | 1/2022 | Trim et al. |
| 11,429,629 B1 | | 8/2022 | Padapati et al. |
| 2004/0088650 A1 | | 5/2004 | Killen |
| 2005/0187897 A1 | | 8/2005 | Pawar et al. |
| 2005/0256835 A1 | | 11/2005 | Jenkins, Jr. |
| 2006/0101391 A1 | | 5/2006 | Ulke et al. |
| 2006/0112123 A1 | | 5/2006 | Clark et al. |
| 2006/0212469 A1 | | 9/2006 | Babanov et al. |
| 2007/0255512 A1 | | 11/2007 | Delenstarr |

(Continued)

*Primary Examiner* — Richard L Bowen
(74) *Attorney, Agent, or Firm* — Knobbe, Martens, Olson & Bear, LLP

(57) ABSTRACT

Systems and methods are described to generate reverse dependency lists for cells in a workbook data store. In one aspect, a system populates, for a first cell in the data store, a reverse dependency list identifying a second cell, wherein the second cell comprises a second cell value that depends, at least in part, on a first cell value of the first cell. The system then detects a change to cell information for the first cell, and based on the detected change to the cell information: marks the second cell for recalculation based on the second cell being identified in the reverse dependency list for the first cell and the detected change to the cell information. For each marked cell, the system performs recalculation on the marked cell, performs recalculation recursively on any cells on which the marked cell depends, and stores recalculated cell values in a recalculated cache.

22 Claims, 5 Drawing Sheets

(56) References Cited

U.S. PATENT DOCUMENTS

| | | |
|---|---|---|
| 2008/0162426 A1 | 7/2008 | Haug |
| 2008/0256432 A1 | 10/2008 | Sambandam et al. |
| 2009/0012974 A1 | 1/2009 | Cassidy |
| 2011/0113048 A1 | 5/2011 | Njemanze |
| 2011/0167056 A1 | 7/2011 | Khanolkar et al. |
| 2012/0008401 A1 | 1/2012 | Katz et al. |
| 2012/0066390 A1* | 3/2012 | Salsbery ............... G06F 9/50 709/226 |
| 2013/0086064 A1 | 4/2013 | Salch et al. |
| 2013/0117651 A1 | 5/2013 | Waldman et al. |
| 2013/0262974 A1 | 10/2013 | Anstis et al. |
| 2014/0279962 A1 | 9/2014 | Schreter et al. |
| 2015/0120748 A1 | 4/2015 | Kraynak et al. |
| 2015/0199378 A1 | 7/2015 | Reyntjens |
| 2015/0363725 A1 | 12/2015 | Andersson |
| 2017/0140000 A1 | 5/2017 | Mielenhausen |
| 2017/0228460 A1 | 8/2017 | Amel |
| 2017/0315979 A1 | 11/2017 | Boucher et al. |
| 2018/0157468 A1 | 6/2018 | Stachura |
| 2018/0203924 A1 | 7/2018 | Agrawal |
| 2018/0375805 A1 | 12/2018 | Sethi |
| 2019/0146998 A1 | 5/2019 | Jin |
| 2019/0147031 A1 | 5/2019 | Dvorak |
| 2019/0294689 A1 | 9/2019 | Mathur et al. |
| 2019/0370322 A1* | 12/2019 | Miller, III ............. G06F 16/322 |
| 2019/0384762 A1 | 12/2019 | Hill |
| 2020/0057819 A1 | 2/2020 | Mathur |
| 2020/0233905 A1* | 7/2020 | Williams ............... G06F 16/904 |
| 2020/0250166 A1 | 8/2020 | Mathur |
| 2021/0089537 A1 | 3/2021 | Hanson et al. |
| 2021/0157812 A1 | 5/2021 | Rumiantsau |
| 2021/0304146 A1 | 9/2021 | Helft et al. |
| 2021/0357241 A1* | 11/2021 | Srinivasan ............ G06F 40/205 |

* cited by examiner

DATA RECALCULATION AND LIVELINESS IN APPLICATIONS

BACKGROUND

Computing devices can utilize applications ("apps") to view, update, and/or exchange data, for example via a communication network. Applications are usually created by software developers, who utilize coding languages to create the application. A variety of types of applications exist. For example, a desktop application can include code executable by a traditional fully-fledged operating system (e.g., a desktop or a laptop), a mobile application can include code executable on a mobile device, and a web application can include code executable in a web browser (which itself is an application executing on a device). When the data is updated or otherwise changed, internal cross-references may need to be updated. For example, other data that depends on the updated or changed data also needs to be updated or marked for updating to be consistent with the updates or changes made to the data. As the amount of data associated with one or more apps increases, so do relationships between the data, thereby increasing complexities managing data in databases associated with the apps.

DETAILED DESCRIPTION

Figure 1:
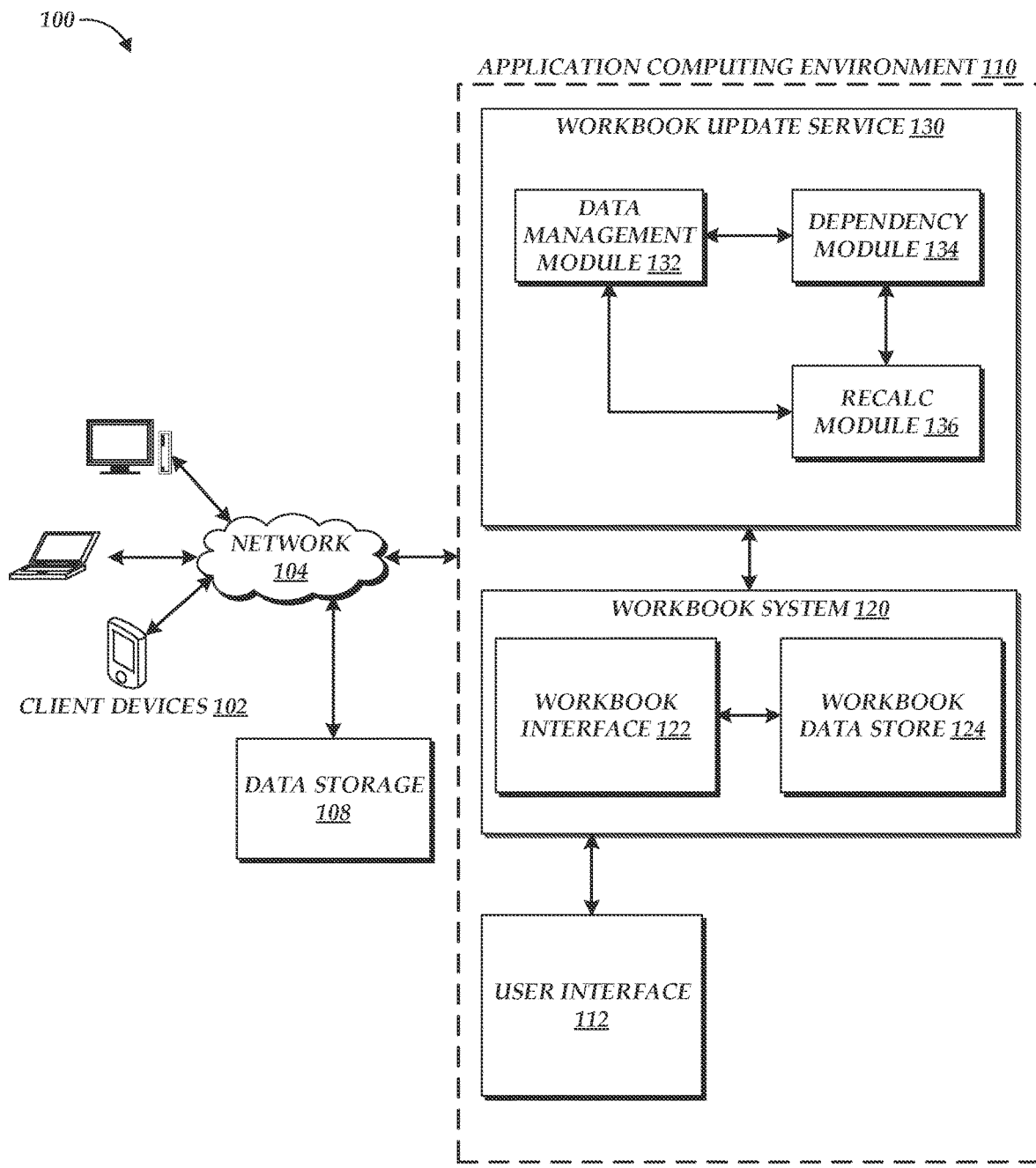
FIG. 1 is a block diagram depicting an illustrative environment in which client devices may interact with an application computing environment to update data in a corresponding data store.

Generally described, aspects of the present disclosure relate to systems and methods for improving recalculation times for processing data in a workbook in response to receiving a user input to update, change, or mutate (hereinafter referred to as "change") data in the workbook. Thus, the systems and methods assist with management of the data in the workbook. The workbook may be associated with one or more applications that are accessible to multiple users, where the users may use the applications to view, manage, or modify data in the workbook. As the one or more applications associated with the workbook are used, the workbook may include ever increasing amounts of data, where the size of the data and corresponding data models increases with time, sometimes rapidly. However, prior recalculation engines perform recalculation and similar analysis in a manner that is proportional to the size of the data. For example, as a number of cells in the workbook increases, the amount of time required by the recalculation engine to perform the recalculation on all of the cells in the workbook (which is the general way the prior recalculation engine operates). Thus, the extent of the recalculation or analysis (for example, the time or processing resources required) increases as the size of the workbooks and/or the amounts of data to be recalculated or analyzed increases, which may result in significant increases in latency and may make corresponding systems and methods unusable or less popular.

When one of the users, for example via one or more client computing devices, makes a mutating change to data in the workbook (for example, performs a cell update, table deletion, cell deletion, formula change, and so forth), the change may be documented as an event to be processed in a First In First Out ("FIFO") order. When the systems and methods execute the event, an event handler applies the mutating change to the cell identified in the user input as it is stored in the workbook and then invokes a workbook evaluation on all other data in the workbook (for example, other cells). For example, the mutating change to the cell may have cascading effects to other cells of the workbook (for example, resulting in mutations or changes to the other cells in the workbook) that depend on the changed cell. The workbook evaluation enables the prior recalculation engine to update cell, table, sheet, and so forth, values in the workbook (for example, cells that depend from or on the mutated cell) as needed based on the mutating change in the event.

For example, the user input may make a change to the formula in a first cell, A1, changing the formula from A1=SUM(B1, C1) to A1=B1. Accordingly, the user input changes the formula of A1 so that the value of A1, which was previously dependent on a sum of the values of cells B1 and C1, is dependent now solely on the value of the cell B1. Prior recalculation engines may reevaluate the cell A1 based on the new formula but may not know what other cells need to be updated based on the change to the cell A1. Accordingly, the prior recalculation engines may update all other cells in the workbook based on the change to the cell A1 because it is not known what other cells explicitly depend on the cell A1. Furthermore, the prior recalculation engines may be unable to appropriately update the formula for the cell A1 in an efficient manner.

Because the prior recalculation engine embodiments do not know which cells depend on the cell A1, the prior recalculation engine embodiments perform loops or checks through each cell in each workbook (i.e., in each sheet or data store of the workbook) to determine whether any upstream (or reverse dependency) changes result from the mutating change to the cell A1. Such loops or checks can identify cells that depend on the cell A1 and, thus, depend on the changed formula of A1 and cells that do not depend on the cell A1 and, thus, do not depend on the changed formula of A1. For the cells that do not depend on the cell A1 (for example, do not have a formula including the changed cell A1 as an element), the prior recalculation engine embodiments ignore these cells and no further operations are needed with respect to further calculations or updates based on the updated cell A1. However, for cells that do depend on the cell A1 (for example, do have a formula including the changed cell A1 as an element), the prior recalculation engine embodiments must recalculate these cells based on the updated cell A1. Such cells are identified to parse, for example using reverse polish notations. These cells are then subsequently used to evaluate the formula involving the mutated data. If the cell formula depends on other cells, then those cells are evaluated recursively with memoization. However, since each cell may be checked with any update or mutation to the data, the prior recalculation engine embodiments are very time and resource intensive. Such time and resource consumption can increase latency in the workbook and cause corresponding applications to be less responsive, which can be detrimental with users of the applications that use or update the data in the workbook. Furthermore, because not all changes to data (for example, cells) in the workbook will result in changes to other cells, the prior recalculation engine embodiments may expend time unnecessarily performing loops and checks through all cells in the workbook on the basis of a single mutating change changing some portion of a single cell.

The systems and methods described herein implement two strategies for reducing latency recalculation in workbooks where data changes occur. These systems and methods may evaluate cell formulas faster and may evaluate fewer cell formulas as compared to prior recalculation systems and methods. Improvements in indexing of data, cells, formulas, corresponding information, and so forth in the workbook may help improve speed and efficiency of evaluation of cell formulas. Details of such systems and methods that improve speed and efficiency of evaluation of cell formulas and result in evaluating fewer cell formulas (as compared to the prior recalculation engine embodiments are described herein.

The systems and methods described herein may apply various systems or algorithms to identify a list of cells on a reverse dependent list, which identifies those cells that are dependent on the changed formula cell. A "simple" algorithm may perform a recursive evaluation to identify only those cells having formulas that include the changed cell as an element, for example downstream cells. Accordingly, when the formula cell is mutated or changed, the changed formula cell is analyzed to determine what other cells in the workbook need to be updated based on the mutated formula cell, which often cannot or is not tracked or easily determined based evaluating just the formula cell. Thus, because the downstream cells are not stored and cannot be easily determined, the safest possible approach to ensure all cells in the workbook that need to be updated based on the mutating change to the formula cell are updated is to evaluate or review each of the other cells in the workbook. Thus, the "simple" algorithm analysis to identify the downstream cells to update based on the mutating change to the formula cell is proportional to the number of cells in the workbook (for example, as the number of cells in the workbook increases, the resource use for the identification of the downstream cells increases). Additionally, the "simple" algorithms may sever relationships between cell in a dependency graph. For example, when the formula for the cell A1 changes from A1=SUM(B2, C9) to A1=B2, the "simple" algorithm may sever any links between the nodes A1 and B2 and A1 and C9. The "simple" algorithm may then rebuild the links between the nodes according to the new formula A1=B2.

In a best case scenario (for example, scenario having the lowest latency and using the fewest resources), only cells in the workbook that depend on the mutated formula cell are recalculated. This means that only those cells that include the mutated formula cell in a corresponding formula are recalculated in response to the mutation of the formula cell. An upper bound (for example, a maximum number) of a number or set of cells to update in response to the mutating change to the formula cell is the entire workbook, where all other cells in the workbook may include the mutated formula cell in their respective formulas. However, on average, the number of cells to update in response to the mutation of the formula cell is much smaller than the total number of cells in the workbook. Various methodologies can reduce the number of cells to re-evaluate and recalculate in response to the mutation of the formula cell, as described further below.

One strategy to improve the re-evaluation and recalculation of corresponding cells in the workbook implemented by the systems and methods described herein involves a three-stage recalculation process that includes (1) constructing a dependency graph, (2) constructing a calculation chain, and (3) recalculating cells identified in the dependency graph and calculation chain. The dependency graph may identify cell dependencies, or equivalently, which cells are precedents for which others or which cells have formulas with which other cells as elements. Based on this dependency graph, which includes all dependencies between any and all cells in the workbook, the systems and methods herein construct the calculation chain. The calculation chain lists all the cells in the workbook that contain formulas. The cells are placed in an order in the chain that corresponds to the order in which the cells should be calculated. During recalculation, the systems and methods update calculation of the chain based on identifying a formula that depends on a cell that has not yet been calculated or updated based on the mutated cell. When the formula for a cell that is being calculated includes as an element a cell that has not yet been calculated, the cell that is being calculated and its dependents are moved down the calculation chain. For this reason, calculation times can often improve in a new workbook or a workbook that is reevaluated over only a limited number of calculation cycles because the calculation chain is shorter as compared to workbooks with larger quantities of cells. Applying this strategy, the systems and methods may reconstruct the dependency graph and calculation chain when a structural change is made to the workbook, for example when a new formula is entered into one of the cells of the workbook, a new row of cells is added to the workbook, and the like.

However, the reconstruction of dependency graphs can be a time and resource expensive operation, especially as the size of the workbook grows. As such, the example strategy implemented in the three-stage recalculation process above benefits most with respect to time and resource expense when the calculation chain involves minimal changes, for example, when the calculation chain is "stable". However, the three-stage recalculation process or strategy may be most useful in workbooks where dependencies between cells, for example, formula dependencies, are generally static but cell values change, for example in finance models. However, in workbook applications that involve writes of new data, for example, new formulas or new rows of data that result in updates to existing formulas, and so forth, such updates may result in structural changes to the dependency graph and calculation chain because the new or updated formulas change the structures of the dependency graph and chain as opposed to merely data in the corresponding cells. Thus, by implementing just the three-stage recalculation process above, the methods and systems described herein reconstruct the dependency graph and calculation chain for the workbook repeatedly as new data are added to the workbook.

A second possible strategy involves implementing, via the methods and systems described herein, bidirectional (or two-way) dependency tracking with iterative updates. In this strategy, the methods and systems may avoid reconstructing the dependency graph and calculation chain with each structural change to the workbook. The systems and methods may model dependencies between cells of the workbook as a directed graph using nodes and links. Each cell of the workbook may be part of or maintain a plurality of lists. A first list may include other cells that the cell depends on, while a second list may include other cells that depend on the cell. The systems and methods may generate the first list by or during formula parsing the formula of the cell. Thus, the first list may comprise a dependency list (otherwise referred to herein as a forward dependency list) that identifies all other cells on which the cell is dependent. The systems and methods may implicitly track the parsed things, which are created by or output by the formula parsing. The second list may be generated and maintained from workbook generation through updates to the workbook. For example, data is added to the workbook by adding rows or cells to the workbook, as formulas are created or updated, and the second list identifies dependencies for cells that depend on the cell. The second list may be a reverse dependency list and identify all other cells having formulas that include the cell as an element.

A recalculation process based on the bidirectional dependency tracking and as implemented by the systems and methods herein may comprise a two (or more) phase process. In a first phase, the systems and methods may use the second list, for example the reverse dependency list, to mark all other cells that are connected to the updated cell or cells. The marked other cells may then correspond to the cells that need to be updated because the updated cell was updated.

In a second phase, the systems and methods iterate through the marked other cells and invoke recalculations of or on these cells. If the marked other cells depend on additional cells, then the systems and methods recalculate the additional cells recursively as well. In many aspects, the additional cells may be included in the first or second lists after phase 1. Once the systems and methods recalculate any of the other cells, the recalculated other cell is stored in a cache so that if multiple additional cells depend on the recalculated other cell stored in the cache, that cell need only be evaluated or recalculated once.

In addition to tracking a need to change existing additional cells based on the updated cell, the systems and methods may track and update the reverse dependency lists for non-existent cells (for example, cells that no longer exist or do not yet exist). The systems and methods may apply a plurality of formulas to the data in the workbook to compensate for the non-existent cells. For example, a first formula for a first cell may have a single cell reference. When the first cell refers to a single reference cell that does not exist, the first cell may continue to track the relationship with the reference cell using the first list, or dependency list, of the first phase. The systems and methods may also track the reverse dependency of the reference cell with the first cell using the second, or reverse dependency, list of a temporary or placeholder cell. In other embodiments, a cell references multiple other cells. When the second cell refers to one or more cells in a range of cells that do not exist, the second cell may continue to track the relationship with the range of reference cells using the dependency list. However, the systems and methods may also track the reverse dependency of the range of cells with the second cell based on any of a plurality of options. In a first option, similar to the single cell reference above, the systems or methods may generate temporary or placeholder cells to track the reverse dependencies. However, having to create cells for each cell of a range of cells that does not already exist causes a space complexity for the workbook to increase significantly. In a second aspect, the systems and methods may generate or utilize a single intermediate object to represent the relationship of the second cell with the range of cells. The object may track the reverse dependency of existing individual cells of the range of cells in the second list of the existing individual cells by including the object in the second list for the existing individual cells and track the reverse dependency from the object to the second cell in the second list of the object. The second list, however, may be unable to track the reverse dependency of cells that do not yet exist in the range of cells.

The systems and methods may create the reverse dependencies for new cells based on a number of strategies. A first strategy implements a number of interval trees using the systems and methods described herein. For example, the interval trees may identify, for each dimension of a range of cells, which cells from each dimension can belong to the range of cells and then identify those cells that are part of the range based on overlapping dimensions. Thus, the systems and methods identify a set of ranges whose dependencies are to be updated when a new cell in the range is added to the workbook.

However, implementing the interval trees may use substantial memory resources. For example, the space in memory required for the interval trees is proportional to a number of unique references in the workbook because intermediate objects are created to track dependencies between cells and ranges of cells. Additionally, developing and implementing the interval tables with the methods and systems herein is resource and time intensive.

A third strategy involves implementing, via the methods and systems described herein, sparse bidirectional (or two-way) dependency tracking with iterative updates. The third strategy is similar to the second strategy described above with respect to implementing a directed graph and avoiding reconstructing the dependency graph and calculation chain with each structural change to the workbook. Furthermore, the third strategy uses less bidirectional dependency tracking data as compared to the second strategy, as described in more detail below. For example, instead of using the interval trees to handle range references and to handle adding of cells that fall into the range as described with reference to the second strategy, the third strategy creates references to column and row objects while maintaining that the dependency is only part of the created objects. Furthermore, the recalculation process of the third strategy, as implemented by the systems and methods, includes multiple phases, a first phase including generating a reverse dependency list based on a set of cells mutated by inputs and marking all cells associated with the set of mutated cells based on the reverse dependency list. Additionally, rows, columns, and table information (table rows and columns), and so forth are identified for updating. In a second phase, the systems and methods iterate through this set of cells and invokes recalculation on the cells identified in the set of cells.

The third strategy provides multiple advantages for the systems and methods that apply because the systems and methods need not solve the complex problem of creating reverse dependency when new cells are created and saves space as compared to the interval trees of the second strategy. Furthermore, the space and time savings of the third strategy over the second strategy, as well as the high number of cells for which recalculation is avoided, make the third strategy preferable to the second strategy. In some embodiments, the systems and methods may selectively and/or iteratively switch between any of the strategies described herein, enabling the methods and systems to make educated decisions to determine which sacrifices to make to gain other benefits.

In order to obtain benefits from iteratively changing between the described strategies for reducing recalculation and reevaluation processes and gaining the corresponding advantages, the systems and methods may change how and what information for cells it stores in a data store. For example, the systems and methods may store cell information such as at least cell value, cell formula, cell type, a parsed formula tree for the cell, a list of dependencies and reverse dependencies, and other relationship information (for example, information regarding what sheet column the cell belongs to, what sheet row the cell belongs to, what table column the cell belongs to, and what table row the cell belongs to). In some instances, the cell value of a cell may comprise one or more of a static value of the cell or a dynamic value, which may be the result, for example, of evaluation of a formula of the cell. For example, a static value may be "1" while a dynamic value may be "=B2", indicating for example, that the value of the relevant cell should equal the value of cell B2 (and thus change as does the value of the cell B2). In some embodiments, the methods and systems may update this cell information with each cell update. Additionally, the methods and systems described herein may implement or apply algorithms that enable processing of large numbers of recalculations, edits, etc., to various structures in a workbook while maintaining quick and efficient processing to maintain usability in conjunction with applications by various users.

In some aspects, the optimized recalculation using any of the strategies described herein faces scaling issues. Furthermore, the systems and methods may track the cell dependency based on three integers: one for sheet, one for row, and one for column to reduce memory needs for storage and computation. Additionally, to reduce time complexity, the systems and methods can adjust recalculation processes.

In prior systems and methods, recalculation of data in a workbook or data store is a process that, with regards to processing resources required and resulting latency, is proportional to the size of the workbook (for example, the number of cells in the workbook). For example, in the prior systems and methods when a reference cell mutates or changes, carrying those changes throughout the remaining cells in the workbook involves recalculating all of the remaining cells. On average, this results in more recalculation that is actually required, meaning that cells that do not need to be recalculated are recalculated nonetheless. Such prior systems and methods experience increased latency as the size of the workbook increases and can make applications that use or work in conjunction with the workbook unusable. The systems and methods disclosed herein reduce or eliminate the excess recalculations when cells are mutated, thereby improving recalculation latency by recalculating fewer cells and corresponding cell formulas. For example, by generating the reverse dependency list for the mutated cell, the systems and methods described herein can focus recalculation efforts on only downstream cells that depend on the mutated cell, as identified in the reverse dependency list. Thus, by generating the reverse dependency list and performing the recalculation process based thereon, the systems and methods improve calculation efficiencies, reduce latency, and make applications using the data in the workbook usable by customers.

The foregoing aspects and many of the attendant advantages of this disclosure will become more readily appreciated as the same become better understood by reference to the following description, when taken in conjunction with the accompanying drawings.

FIG. 1 is a block diagram depicting an illustrative environment in which client devices may interact with an application computing environment 110 (hereinafter "computing device 110") to update data in a corresponding data store. By way of illustration, various example client devices 102 are shown in communication with the computing environment 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, smartwatch, and the like. The computing environment 110 may provide the client devices 102 with one or more user interfaces 112, command-line interfaces (CLIs), application programing interfaces (APIs), and/or other programmatic interfaces for utilizing services provided by the computing environment 110, including an application builder system 120, and application screens 150. Although one or more embodiments may be described herein as using the user interface 112, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the computing environment 110 or provide services (for example, data storage and the like) to the computing environment 110. The end users operating the client devices 102 may be one or more of owners (for example, an author of an application) of applications or data stored in a workbook or users of applications that result in data stored in the workbook.

The client devices 102 and computing environment 110 may communicate via the network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing environment 110 as depicted in FIG. 1 may operate in a distributed computing environment including several computer systems that are interconnected using one or more computer networks (not shown in FIG. 1), which systems operate to provide a workbook system 120 and a workbook update service 130. Illustratively, the computing environment 110 includes a number of rapidly provisioned and released computing resources configured to provide the workbook system 120 and workbook update service 130. The computing environment 110 may also be referred to as a "cloud computing environment." Each of the workbook system 120 and the workbook update service 130 could also operate within a computing environment having a fewer or greater number of devices than are illustrated in FIG. 1. Thus, the depiction of the workbook system 120 and the workbook update service 130 in FIG. 1 should be taken as illustrative and not limiting to the present disclosure. For example, the elements of the computing environment 110 or various constituents thereof could implement various Web services components and/or peer to peer network configurations to implement at least a portion of the processes described herein. In some instances, the workbook system 120 and the workbook update service 130 may be combined into a single service. Each of the workbook system 120 and the workbook update service 130 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

The workbook system 120 can provide, for the benefit of owners or users and access by client devices 102, an interface by which the owner generates web or mobile applications or users interact with the web or mobile applications. Within the computing environment 110, the workbook system 120 may provide workbook management services (for example, that include application building services or data updating services) to any client device 102 via the network 104. In some embodiments, while labeled as a system, the workbook system 120 may represent one or more services. The workbook system 120 enables owners and users to create, modify, access, or use web and/or mobile applications and create, modify, or access data in the workbook (for example, stored as one or more cells in one or more sheets) via the client devices 102. The workbook system 120 may provide the owner or user access to a workbook interface 122, through which the owner or user may selectively create, access, modify, or use data stored in the workbook. For example, the workbook interface 122 allows the owner to create or the user to use an application to create or modify data stored in the workbook. The workbook system 120 may store applications and corresponding workbooks in a workbook data store 124, which may comprise a data storage or similar device that stores data in a data structure, for example a graph database or any other database. In some embodiments, the workbook may include all relationships and data associated with the corresponding application, including application data (including all corresponding dependencies, etc.), application navigation policies, restrictions on accessibility, cross-references, associated files, and any other features or details of the application. The workbook (including all corresponding application data and so forth) may be stored in the workbook data store 124 to simplify access to and management of any associated applications and the corresponding data.

The workbook data store 124 may work with the data management module 132 to maintain the cell information in the corresponding database structure. For example, the workbook data store 124 may update the cell information in the database structure based on changes identified and/or received by and from the data management module 132. The workbook data store 124 may extract or retrieve data from the data structure based on commands received from the data management module 132, for example via the workbook interface 122. Furthermore, the workbook data store 124 may store or save data into the data structure based on commands received from the data management module 132, for example via the workbook interface 122. For example, the data management module 132 identifies a change or mutation to apply to one or more cells, tables, or sheets in an existing workbook based on an owner or user input. The data management module 132 may send a request to the workbook data store 124 to extract the identified cells, tables, or sheets for mutation or change, to which the workbook data store 124 may provide a response including the identified cells, tables, or sheets. Furthermore, once the mutation or change is completed, the data management module 132 may send a request to the workbook data store 124 to store the updated (for example, the recalculated) data in one or more cells, tables, or sheets in the data structure of the workbook data store 124.

In some embodiments, the workbook interface 122 is separate from the user interface 112 of the computing environment 110, for example as an embedded webpage or similar interface within the user interface 112. Alternatively, or additionally, the user interface 112 and the workbook interface 122 are integrated into a single interface, for example where the user interface 112 is also used to interact with application workbooks.

As described above, the user interface 112 of the computing environment 110 and/or the workbook interface 122 may enable the owner or users to access the workbook system 120 to create, edit, and/or manage applications. The workbook system 120 enables the author or user to create and/or edit data in the workbook storage 124 via the corresponding application. The workbook system 120 may be integrated with the workbook update service 130. The workbook system 120 may activate, select, or utilize any interface that is executed by the workbook update service 130 to create or edit data in the workbook. The workbook update service 130 may include various modules, including a data management module 132, a dependency module 134, and a recalculation module 136 to enable the creation and editing of data in the workbook, as described in further detail below.

The data management module 132 comprises any component that manages data for the workbooks in or associated with the workbook data store 124. The workbook system 120, for example via interaction with the workbook interface 122 or a similar component, may create sheets, tables, or cells of data for new workbooks or edit existing sheets, tables, or cells of data for existing workbooks using the data management module 132. For example, the data management module 132 creates data in the workbook data store 124 in response to an owner request to create the new workbook. The data management module 132 may update or modify data in the workbook data store 124 when the workbook and corresponding data already exists in the workbook data store and in response to an owner or user request to modify the workbook. When creating new data for a new workbook, the data management module 132 may create the sheets, tables, and cells in which data for the workbook is stored. When modifying data in the workbook, the data management module 132 may modify existing data in cells, sheets, tables, etc. or add new data into the cells, sheets, tables, and so forth.

When creating the cells, the data management module 132 may also manage (for example, generate or update) cell information for each of the cells in the workbook. The cell information may include one or more of cell value, cell formula, cell type, a parsed formula tree for the cell, a list of dependencies and reverse dependencies, and other relationship information (for example, information regarding what sheet column the cell belongs to, what sheet row the cell belongs to, what table column the cell belongs to, and what table row the cell belongs to), as introduced above. In some embodiments, the data management module 132 works in conjunction with one or more other modules, for example, the dependency module 134, the workbook interface 122, or the workbook data store 124, to manage the cell information. When the data management module 132 is updating or modifying existing workbooks, then the data management module 132 may update, modify, or mutate one or more of the cell values, cell formulas, table structures, and so forth.

The dependency module 134 may determine, evaluate, recalculate, update, or otherwise be related to dependency lists or reverse dependency lists for cells in the workbook. Thus, the dependency module 134 may perform one or more actions related to the dependency or reverse dependency, or dependency or reverse dependency lists, of any data in the workbook. The data management module 132 communicates with and utilizes the data dependency module 134 to generate dependency and reverse dependency information for cells, tables, and sheets of the workbook. For example, the data management module 132 may use the dependency module 134 to identify the dependency information and reverse dependency information for any cell, table, or sheet in the workbook. When the data management module 132 is creating the workbook with initial data, the dependency module 134 may generate the dependency information for the new data in the workbook. For example, the dependency module 134 may generate one or both of the dependency list or the reverse dependency list for each cell, table, sheet, and so forth.

The recalculation module 136 may invoke or implement any recalculation process with respect to cells in the workbook. Thus, the recalculation module 136 may perform one or more actions related to the recalculation or reevaluation of formulas, relationships, etc., for any data in the workbook.

As described above, the second strategy utilizes two-way or bidirectional dependency tracking for cell relationships with iterative updates to the dependency tracking, implemented by the workbook update service 130 and the workbook system 120, for example. The data management module 132 may model dependencies between cells in a workbook as a directed graph. For example, the data management module 132 may generate the cells and the corresponding cell information in the workbook, where each cell has associated therewith two dependency lists as part of its corresponding cell information. The first list, as described above, is a dependency list for the cell and the second list is a reverse dependency list for the cell. The dependency list may identify one or more other cells that the cell depends on. The data management module 132 may determine which other cells the cell depends on based on the formula for the cell and parsing the formula, where the other cells are parsed things from parsing the formula for the cell. Thus, when the formula for the cell identifies or includes other cells as elements of the formula, then the other cells identified in the formula comprise the other cells identified in the dependency or first list. The reverse dependency list may identify one or more other cells that depend on or from the cell. The data management module 132 may determine the reverse dependency list for each cell when constructing the workbook. As new cells or relationships are introduced, the data management module 132 (or the dependency module 134) updates the reverse dependency list to include the reverse dependencies. For example, the cell A2 is added to the workbook with a formula setting it equal to double the value of cell A1, or A2=(A1*2). The data management module 132 generates the dependency list to show that the cell A2 is dependent on the cell A1. Additionally, when the cell A2 is added to the workbook, the data management module 132 generates or updates the reverse dependency list for the cell A1 to show that the cell A1 has another cell dependent on it, namely the cell A2. Thus, as the workbook grows and new formulas are added between cells in the workbook, the reverse dependency list for each cell can grow accordingly.

As described herein, the dependency and reverse dependency lists enable the computing environment 110, and more specifically the workbook update service 130, to perform recalculation and reevaluation processes on the data stored in the workbook as changes that impact the relationships or dependencies of the cells in the workbook are made. For example, when the owner or the user adds new data to the workbook or modifies formulas for existing cells in the workbook, the data management module 132 may update cells in the workbook according to the new data or the modifications and also recalculate other cells not directly impacted by the new data or modifications by the recalculation and reevaluation processes. The recalculation process, as applied by the data management module 132, may ensure that cells dependent on the new cells or modified cells are appropriately updated based on structural changes made to the dependency and reverse dependency chains for the cells. Effectively, the recalculation process allows the data management module 132 to ensure that no cells in the workbook become stale or have an outdated or inaccurate value due to a link being broken between the cell and any cells on which it depends. The data management module 132 may perform the recalculation process via the recalculation module 136 to update and keep fresh the data stored in the workbook data store 124.

In a first phase of the recalculation process, one of the data management module 132 or the recalculation module 136 marks one or more cells that are dependent on a set of mutated cells, or cells changed in view of an input from the owner or user. Additionally, the first phase comprises marking all cells that are directly or indirectly connected to the set of mutated cells. The data management module 132 or the recalculation module 136 may apply the reverse dependency list for each of the set of mutated cells to identify the one or more cells to mark based on their dependency indicated in the reverse dependency lists. In a second phase of the recalculation process, the recalculation module 136 iterates through the one or more marked cells to recalculate all of the marked cells based on changes or updates to the upstream cells (or the cells on which the marked cells depend). In some embodiments, the marked cells may depend on one or more additional cells that are not part of the set of mutated cells, in which case the recalculation module 136 performs the recalculation process to these additional cells as well. When performing the recalculation process, the recalculation module 136 may interface with one or more of the data management module 132, the workbook data store 124, and the workbook interface 122 to recalculate the cells in the workbook data store 124 and store or save the recalculated cells in a recalculated cache for reference by other cells if necessary. Storing the recalculated cells for later reference may reduce duplicative recalculation when a marked cell depends on multiple cells of the set of mutated cells.

In addition to tracking a need to change known or existing additional cells based on the mutated cell, the data management module 132 may track and update references or reverse dependency lists for non-existent cells (for example, cells that no longer exist or do not yet exist). The data management module 132 may apply one or more of a plurality of strategies to references between the mutated cells and cells on which the mutated cells depend or that depend on the mutated cells when one or more of the cells on which the mutated cell depends does not exist, for example are non-existent cells. For example, a first cell formula may have a single cell reference. For example, when the first cell refers to a single reference cell (for example, the first cell A1=reference cell B1) that does not exist, the first cell A1 may continue to track the relationship with the reference cell B1 using the first list, or dependency list, described above with reference to the first phase. The data management module 132 may store the dependency list for the first cell A1 in the data structure in the workbook data store 124 or a similar data store, for example as part of the cell information for the first cell A1. In some embodiments, the data management module 132 may coordinate storing and accessing the dependency list and the reverse dependency list in the workbook data store 124. The data management module 132 may track and identify that the first cell A1 should be set equal to the reference cell B1, even if the reference cell B1 does not exist. The data management module 132 also manages and tracks the reverse dependency of the first cell A1 on the reference cell B1. For example, the data management module 132 may track, for the reference cell B1 that is non-existent, that the first cell A1 is dependent on the reference cell B1 using the second, or reverse dependency, list for the reference cell B1. The reverse dependency list for the non-existent reference cell B1 is generated by creating, via one or more of the data management module 132 and the dependency module 134, a temporary or placeholder cell in place of the reference cell B1. By generating the placeholder cell B1, the workbook update service 130 is able to track the dependency of the first cell A1 on the reference cell B1 from the perspective of the placeholder cell B1. The data management module 132 may store the reverse dependency list for the placeholder cell B1 in the data structure in the workbook data store 124 or a similar data store, for example as part of the cell information for the placeholder cell B1.

In other embodiments, a cell references multiple other cells. For example, a formula for the cell B1 is B1=SUM (C1:C10). While the cell B1 is set equal to the sum of the range of cells C1:C10, only the cells C1 and C2 in the range C1:C10 may exist when initially created. In such an instance, the cell B1 may track its dependencies based on the formula SUM(C1:C10). However, the reverse dependencies of the cell B1 being dependent on each of the cells C1:C10 from the perspective of each of the cells C1:C10 may be tracked in various ways. In a first aspect, similar to the single cell reference above, the systems or methods may generate temporary or placeholder cells in place of each of the cells C1:C10 to track the dependency of the cell B1 on each of the cells C1:C10 in the reverse dependency list for each of the cells C1:C10. However, having to create cells for each cell that does not already exist causes a space complexity for the workbook to increase significantly. In a second aspect, the systems and methods may generate or utilize a single intermediate object to represent the relationship of the cell B1=SUM(C1:C10), for example an object "C1:C10". The object C1:C10 may track the reverse dependency of the cells C1 and C2 to the object C1:C10 in the second list of the cells C1 and C2 by including the object C1:C10 in the second list for the cells C1 and C2 and track the reverse dependency from the object C1:C10 to the cell B1 in the second list of the object C1:C10. The second list, however, may be unable to track the reverse dependency of cells that do not yet exist in the range of cells C1:C10. For example, when the cell C3 is created, the systems and methods must account for the cell C3 belonging to the range of cells C1:C10 and thereby create the reverse dependency between the cell C3 and the object C1:C10 in the second list for the cell C3. In this way, as cells that are in the range C1:C10 are added to the workbook, the reverse dependency lists for the added cells and the object C1:C10 are automatically updated to identify the object C1:C10 and the cell B1, respectively.

As described above, the computing environment 110, via one or more of the workbook system 120 or the workbook update service 130, may create the reverse dependencies for newly added cells based on a number of strategies. A first strategy involves implementing a number of interval trees. For example, the workbook system 120, via the data management module 132, may apply the interval trees to identify, for each dimension of the workbook and the data stored therein, where one interval tree exists for each dimension, all ranges that contain a particular cell. More specifically, the data management module 132, or other component of the computing environment 110, generates the intervals for a Y-axis dimension interval tree based on row indices of the ranges in the workbook and an X-axis dimension interval tree based on column indices of the ranges in the workbook. The data management module 132 may use the row index to query intervals along the Y-axis interval tree for the range C1:C10 and use the column index to query intervals along the X-axis interval tree for the range C1:C10. An intersection of the two sets of intervals resulting from the queries above may represent a set of ranges whose dependencies are to be updated when a new cell in the range is added to the workbook.

For example, the workbook may include cells having the following formulas: Z1: SUM(C2:E10), Z2: SUM(B5:F10), Z3: SUM(C3:E11), and Z4: SUM(B6:F11). Under one possible dependency management algorithm, for the above setup of formulas, the computing environment 110 (for example, via the data management module 132) may create range objects C2:E10, B5:F10, C3:E11, B6:F11 and then create dependencies between Z1 and C2:E10, Z2 and B5:F10, Z3 and C3:E11, Z4 and B6:F11. If a user then mutates or changes cell D4 (an example cell within some of the ranges noted above), the computing environment 110 may, as part of the recalculation described herein, find all the cells which should be updated in response to this mutation or change to cell D4. To do this, the computing environment 110 may query an interval tree for an x-axis for the mutated column D. The interval tree may identify that ranges C2:E10, B5:F10, C3:E11 and B6:F11 all intersect with column D. The computing environment may then query the interval tree along the y-axis for input row 4 (corresponding to D4). The interval tree may identify that ranges C2:E10 and C3:E11 intersect with row 4. Based on these identified intersections, the computing environment 110 may take the intersection of the first and second query results to derive that ranges C2:E10 and C3:E11 are to be updated because of the mutation to cell D4 but not B5:F10 or B6:F11. The computing environment 110 can then use the graph to traverse the dependency back to Z1 and Z3 and recompute/recalculate them while correctly not recalculating Z2 and Z4.

However, implementing the interval trees may use substantial memory resources in the computing environment 110. For example, the space in memory required for the interval trees is proportional to a number of unique references in the workbook because intermediate objects are created to track dependencies between cells and ranges of cells. More specifically, the interval trees may use O(n) space in memory and require O(log(n)+m) time to generate and calculate, where n is a number of intervals and m is a number of matching intervals. Developing, implementing, and processing the interval tables with the components of the computing environment 110 involves extensive resources and time, all of which is detrimental in providing applications to users on demand. Such resource and time use may make the associated applications appear sluggish and deter further user by the users and/or otherwise discourage users from continuing use of the corresponding applications.

As described above, the data management system 132 may implement the third strategy involving sparse bidirectional (or two-way) dependency tracking with iterative updates. The third strategy is similar to the second strategy described above in that the data management module 132 implements a directed graph and avoids reconstructing the dependency graph and calculation chain with each structural change to the workbook, as described relative to the first strategy above. However, instead of using the interval trees to handle range references and to handle adding of cells that fall into the range as described with reference to the second strategy, the data management module 132 can create references to column and row objects while maintaining that the dependency is only part of the created objects. For example, when the formula for the cell A1=SUM(B1: B1000), the dependency list for A1 can be simplified to column B so that any change to any cell in column B triggers recalculation of the cell A1. Such an algorithm may simplify the dependency tracking for large ranges but may result in excess calculations. For example, for the formula for cell A1=SUM(B1:B1000), when the algorithm establishes that the cell A1 should be recalculated on any change to any cell in the column B, the cell A1 may be recalculated more than necessary because a change in the cell B2000 may result in the recalculation of the cell A1 even though B2000 is not an element in the formula for the cell A1.

Furthermore, the recalculation process of the third strategy, as implemented by the data management module 132, includes multiple phases. In a first phase, the data management module 132 generates a reverse dependency list based on a set of cells mutated by inputs, for example via an application, a user, and so forth. The data management module 132 or the dependency module 134 apply the reverse dependency list to mark all cells associated with the set of mutated cells. Additionally, rows, columns, and table information (table rows and columns), and so forth are identified for updating. This effectively expands a set of cells that have range formulas over those columns to include cells to be updated. In a second phase, the data management module 132, the dependency module 134, or the recalculation module 136 iterate through this set of cells and invokes recalculation on the cells identified in the set of cells. If one of the cells in the set of cells depends on one or more other cells, then the one or more other cells is recalculated recursively (although the one or more other cells should already be in the set of cells following the first phase of the third strategy). Once one of the cells from the set of cells (or the one or more other cells) has been recalculated, that recalculated cell is stored, for example by the data management module 132, in an already recalculated cache or identified in a corresponding list, for example in the workbook data store 124, so that even if multiple cells depend on the recalculated cell, the data management module 132 can determine that the recalculated cell has already been recalculated and therefore only recalculate that cell one time, saving from recalculating cells more than one.

The third strategy provides multiple advantages for the workbook update service 130 or the workbook system 120 over the first and second strategies because the corresponding components need not solve complex problems of creating reverse dependencies when new cells are created. Additionally, by eliminating the need to create and apply interval trees, the components of the workbook update service 130 or the workbook system 120 save space as compared to the interval trees of the second strategy. However, the third strategy may introduce issues regarding space complexity, which increases due to costs of tracking dependencies, though these complexities are more tractable than the space complexities introduced by the first strategy. Furthermore, the third strategy, when implemented by the workbook update service 130 or the workbook system 120, may trigger evaluation of more cells than necessary as a result of the sparse dependency tracking when handling a range of formulas or a range of cells. Accordingly, the workbook update service 130 or the workbook system 120 may, when tracking dependency on the entire column and row, divide the columns or rows into smaller parts or segments and track the dependency on the smaller parts of the column if the cell formula allows for such analysis. However, the space and time savings of the third strategy over the second strategy, as well as the high number of cells for which recalculation is avoided, make the third strategy preferable over the second strategy in some embodiments of the workbook.

The workbook system 120 or the workbook update service 130 may selectively and/or iteratively switch between any of the strategies described herein. For example, when the workbook is newly created or includes a limited number of cells or mutations to the workbook reduce the size of the workbook below a first or minimum threshold size, the workbook system 120 or the workbook update service 130 may implement the first strategy described above. However, when the workbook size exceeds a second or maximum threshold size, the workbook system 120 or the workbook update service 130 may select the third strategy. By iterating or selecting between different strategies, the workbook system 120 or the workbook update service 130 can make educated decisions to determine which sacrifices to make. For example, the workbook system 120 or the workbook update service 130 may determine to make trade-offs between time and space complexity to enable handling of larger amounts of data.

To perform the strategies and options described above to obtain the benefits described herein, for example from iteratively changing between the described strategies, the data management module 132 and the workbook data store 124 may collect and store various information for the cells stored in the workbook data store 124. For example, in some embodiments, to enable the iterative change or selection between different strategies, the data management module 132 and the workbook data store 124 may store cell information such as at least cell value, cell formula, cell type, a parsed formula tree for the cell, a list of dependencies and reverse dependencies, and other relationship information. The other relationship information may include information regarding what sheet column the cell belongs to, what sheet row the cell belongs to, what table column the cell belongs to, what table row the cell belongs to, and so forth. In some embodiments, the data management module 132 may update this cell information with each cell update. Furthermore, updates of the cell information may occur at various events for the workbook, including: an update to existing cells, a deletion of existing cells, a deletion of a sheet of cells, a deletion of a table, an appending of one or more rows to a table, an updating of rows in a table, a deletion of a row from a table, an appending of one or more columns to a table, an updating of a column style, and so forth.

In some embodiments, the data management module 132 may reevaluate and recalculate volatile functions in the workbook in every recalculation cycle. Therefore, the data management module 132 may track the volatile functions separately from the cell information described above. The data management module 132 may then add the cells that are affected by the volatile functions to the set of cells that are recalculated in every recalculation cycle along with all reverse dependencies of the cells having the volatile functions as cell functions.

In some aspects, the optimized recalculation using any of the strategies described herein faces scaling issues. For example, in various use cases or models, one column in a table or sheet depends on a different column in the table or sheet, respectively. For example, when one column is a filter formula column and another column is a fact table, the fact table may be continuously appended with new data by users via mobile apps or workflows. The continuous updates to the fact table column may result in near continuous or constant re-evaluation of the entire filter column based om the above strategies. However, this may lead to various problems. For example, the fact table column may need to track all the cells which depends on the fact column (which increase memory demands as the column includes larger amounts of cells). Additionally, the data management module 132 may have to recalculate all of the cells in the filter formula column when there is an update to the fact table column, which also increases time and resource requirements for processing.

The data management module 132 may track the cell dependency, for example via the dependency module 134, based on three integers: one representing a sheet for the cell, one representing a row for the cell, and one representing a column for the cell. When considered with respect to storage, for example in the workbook data store 124, when the data management module 132 tracks 100,000 cell reverse dependencies, the reverse dependencies requires 1.2 megabytes (MB) of storage space. When tracking a million cell reverse dependencies, the reverse dependencies alone would use 12 Mb. However, instead of tracking individual cells, the data management module 132 may spend more time to track continuous ranges of cells, which can save storage space. For example, instead of tracking that each of cells A1, A2, A3 . . . A1M depends on Column B, the data management module 132 or the dependency module 134 can track that the range of cells A1:A1M as a single object depends on Column B, which reduces memory needs for storage and computation.

Furthermore, to reduce time complexity, the data management module 132 can adjust recalculation processes. For example, after the first phase, if the collection or marked cell (marked for updating) does not contain anything except for a filter cell column(s), the systems and methods may delay the recalculation until when a query for the filter cell is received. Alternatively, the systems and methods may make iterative updates to a table view. For example, if the filter criteria does not contain any cell that is part of the marked cells for updating after the first recalculation phase, then the table view for the filter cell can update itself by simply looking at only the table row that was updated.

The systems and methods described herein and enabled by the workbook system 120 or the workbook update service 130 provide solutions to the issues and provide the benefits or advantages as identified above.

Figure 2:
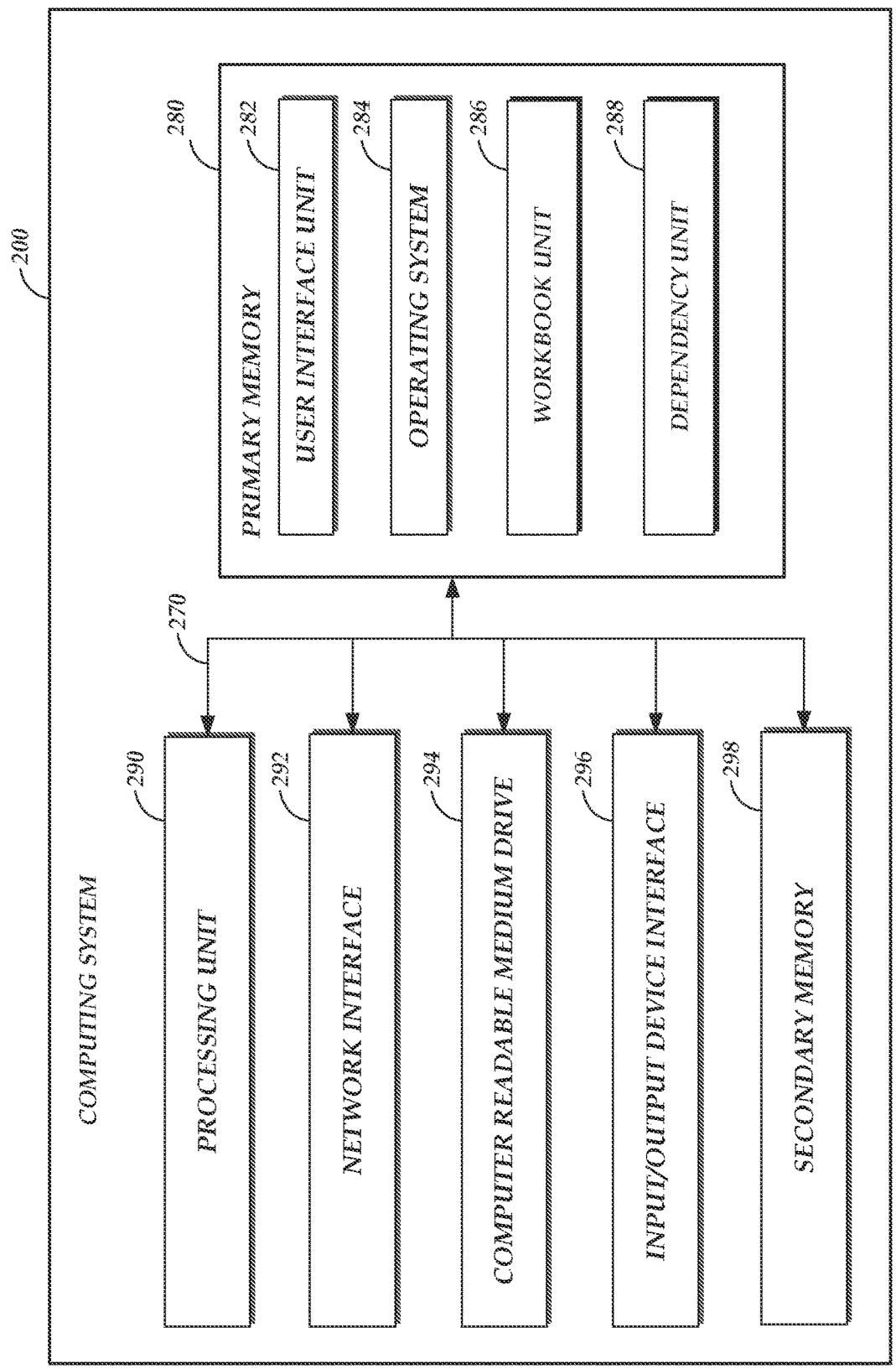
FIG. 2 depicts a general architecture of a computing system implementing one or more of the client devices and the application computing environment of FIG. 1.

FIG. 2 depicts a general architecture of a computing system 200 implementing one or more of the client devices 102 and the application computing environment 110 of FIG. 1. The general architecture of the computing system 200 depicted in FIG. 2 includes an arrangement of computer hardware and software that may be used to implement aspects of the present disclosure. The hardware may be implemented on physical electronic devices, as discussed in greater detail below. The software may be implemented by the hardware described herein. The computing system 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the computing system 200 includes a processing unit 290, a network interface 292, a computer readable medium drive 294, and an input/output device interface 296, all of which may communicate with one another by way of a communication bus 270. The network interface 292 may provide connectivity to one or more networks (for example, the network 104) or computing systems (for example, the client devices 102). The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, cloud storage objects or services (for example, Amazon's Simple Storage Service (S3), block and file services (for example, Amazon's Elastic Block Store (EBS) or Elastic File System (EFS), and the like. In some embodiments, all of the primary memory 280 or the secondary memory 298 may utilize one of the tiers of memory devices identified above. The primary memory 280 is assumed for the purposes of description to represent a main working memory of the computing system 200, with a higher speed but lower total capacity than secondary memory 298.

The primary memory 280 may store an operating system 284 that provides computer program instructions for use by the processing unit 290 in the general administration and operation of the computing system 200. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a web browser or software application installed on the computing device.

In addition to and/or in combination with the user interface unit 282, the memory 280 may include a workbook unit 286 that facilitates management of the workbook in conjunction with and for use with web and mobile applications. Illustratively, the workbook unit 286 may configure the computing system 200 to accept requests and/or commands to create, modify, access, or view data stored in or with respect to a workbook by one or more of the web or mobile application or the owner or user. The workbook unit 286 may implement those requests and/or commands (e.g., by instructing physical host devices implementing the workbook system 120 and the workbook updating service 130 to route network traffic and data in a manner corresponding to creation, management, and use of a the data of the workbook. The dependency unit 288 facilitates management of the workbook in conjunction with and for use with dependency information, for example in response to data manipulations or mutations by the web and mobile applications. Illustratively, the dependency unit 288 may configure the computing system 200 to accept requests and/or commands to create, modify, access, or view dependency data stored in or with respect to a workbook by one or more of the web or mobile application or the owner or user. The dependency unit 288 may implement those requests and/or commands (e.g., by instructing physical host devices implementing the dependency module 134 to route network traffic and data in a manner corresponding to creation, management, and use of the dependency lists and other information stored for cells of the workbook.

The computing system 200 of FIG. 2 is one illustrative configuration of such a device, of which others are possible. For example, while shown as a single device, the computing system 200 may, in some embodiments, be implemented as multiple physical host devices. In other embodiments, the computing system 200 may be implemented as one or more virtual devices executing on a physical computing device. While described in FIG. 2 as a computing system 200, similar components may be utilized in some embodiments to implement other devices shown in the environment 100 of FIG. 1.

Figure 3A:
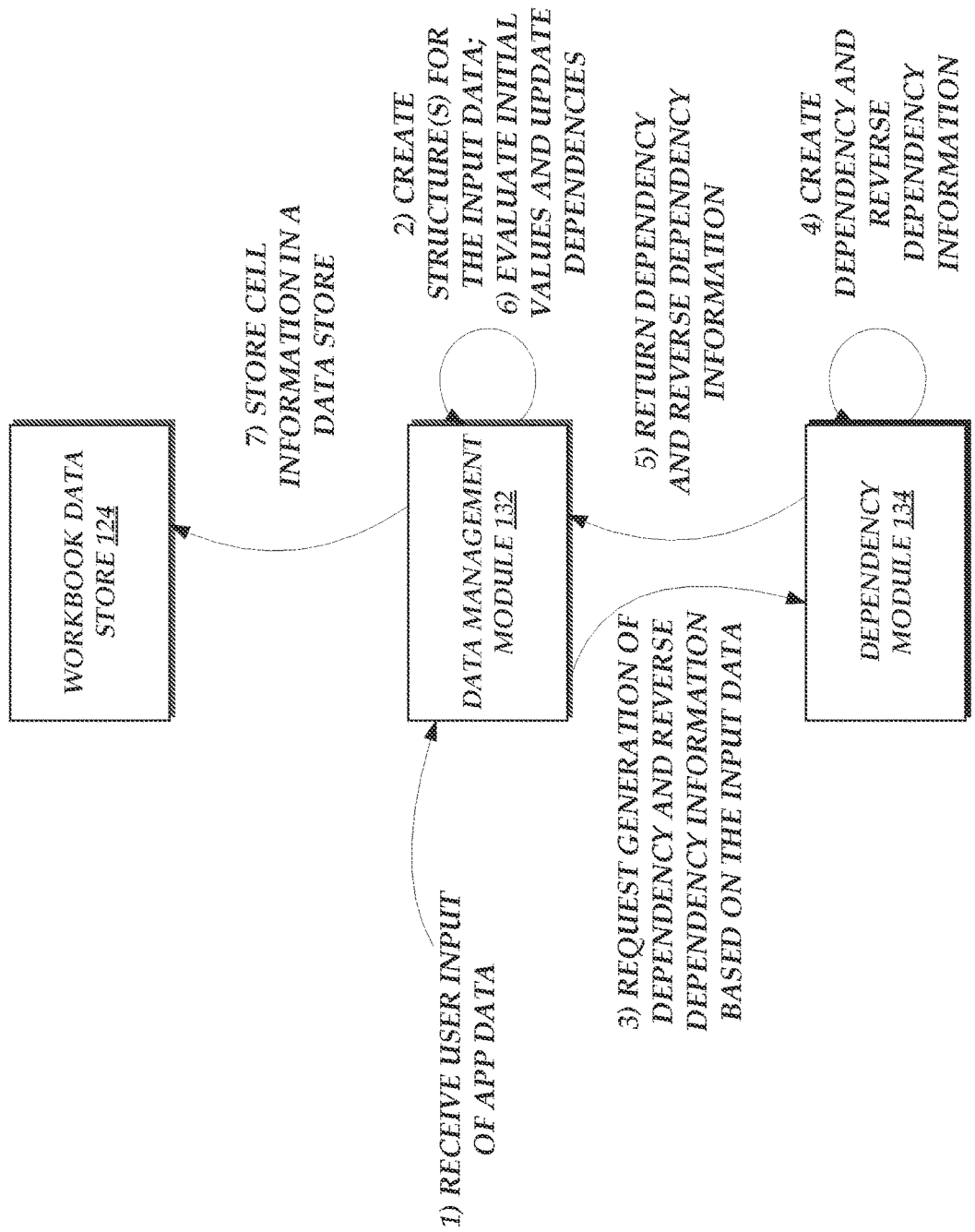
FIGS. 3A-B are flow diagrams depicting illustrative interactions for handling changes to data in the workbook based on a user input of application data and subsequent recalculations based on dependency lists for data cells.

With reference to FIG. 3A, illustrative interactions will be described for automatically creating a workbook based on an input of application data from a user. For purposes of FIG. 3A, it is assumed that the owner has previously established or created a workbook and corresponding data store framework such that the workbook associated with a corresponding application already exists and is accessible by the owner and users. Effectively, by the time the interactions shown in FIG. 3A occur, the owner or user is accessing the workbook system 120 associated, for example with the application, using one of the client devices 102 via the network 104.

With reference to FIG. 3A, at (1), the data management module 132 receives owner or user input of application data. The application data may be entered into the workbook (for example, via the database view described herein) directly by the owner or user via one of the client devices 102 or obtained/imported from a network accessible storage 108 of FIG. 1. Generally, the application data may include initial data being entered into the workbook, additional data being appended to existing data in the workbook (for example, that involves adding one or more columns or rows to a table in the workbook or changing one or formulas for cells in the workbook), deletion of data from the workbook (for example, that involves deleting one or more columns or rows from a table in the workbook), reformatting of data structures in the workbook, moving or renaming of data structures in the workbook, and so forth. For the purposes of FIG. 3A, the application data received from the input is new data being added to the newly created workbook.

At (2), the data management module 132 uses the owner or user input to create corresponding structures in the workbook. For example, the data management module 132 may create sheets and/or cells in the workbook for the application data in the input. For example, when the application data includes one or more of values or formulas for cells and other cell information as described above, the data management module 132 creates the corresponding cell and sheets and other data structures for storage of the application data in the workbook data store 124. Additionally, the data management module 132 may create data structures (for example, tables, and so forth), in the workbook with the initial data. If the owner or user input includes data to be appended to existing data in the workbook that does not change the structure of the workbook (for example, does not require reevaluation or recalculation of the workbook), the data management module 132 may add the owner or user input data to the existing data in the workbook. Effectively, the data management module 132 makes any necessary changes to the data in the workbook with respect to the received application data.

Therewith or thereafter, at (3), the data management module 132 generates a request for the dependency module to generate dependency and reverse dependency lists and corresponding information based on the input application data from (1). The specifics of the request generated at (3) may identify specific cells for which the dependency or reverse dependency information is requested or may be a blanket request for all cells in the workbook. For example, the data management module 132 may identify which cells are marked for updating based on the strategies or options described above. Where the owner or user input of application data at (1) was the initial data for the workbook, then the request generated at (3) may comprise a request to create the initial dependency and reverse dependency information and lists. In some embodiments, the request generated at (3) includes details for the dependency module 134 to generate the dependency information, for example formulas for cells for which dependency information is requested and the like.

At (4), the dependency module 134 generates the dependency information. The dependency module 134 may apply one or more of the strategies or options described herein when generating the dependency or reverse dependency information. For example, the dependency module 134 may use the formulas provided in the request at (3) to generate dependency information for the corresponding cell, where the formula identifies the other cells on which the corresponding cell depends. Thus, the dependency module 134 may perform the formula parsing described above to identify other cells for the dependency list for one or more corresponding cells. In some embodiments, the dependency module 134 identifies the reverse dependencies when parsing formulas for the cells and generating the corresponding dependency lists. For example, when the dependency module 134 parses the formula A1=SUM(B1:C1), the dependency module 134 may identify that A1 is dependent on B1 and C1 (and any cells therebetween) and add both of B1 and C1 (and any cells therebetween) to the dependency list for A1. Furthermore, the dependency module 134 may use this parsing to identify that B1 and C1 each has A1 on its respective reverse dependency list. Thus, the dependency module 134 may process all cells in the workbook and identify all dependency lists and reverse dependency lists for the cells in the workbook at (4).

Thereafter, or therewith, at (5), the dependency module 134 may convey the generated dependency lists and reverse dependency lists to the data management module 132. In some embodiments, though not shown in FIG. 3A, the dependency module 134 may convey the generated dependency lists and reverse dependency lists to the recalculation module 136 or to the workbook data store 124. In some embodiments, the At (6), the data management module 132 may use the dependency lists and the reverse dependency lists to identify or calculate initial values for the cells and, thus, the workbook when the cell is being created or inserted into the workbook. For example, identifying or calculating the initial values comprises calculating the initial values for the cell (and, accordingly, the workbook) based on the corresponding formula for the cell. In some embodiments, when evaluating or calculating the values for the cells, the data management module 132 can infer or identify dependencies for the cells and update the corresponding dependency graph based on the evaluation results. For example, when evaluating the initial values for one of the cells, the data management module 132 may parse and evaluate the formula for the cell. As part of this parsing and evaluating of the formula, the data management module 132 may identify dependencies that are not in the dependency graph for the cell and update the dependency graph accordingly. Accordingly, at (6), the data management module 132 may help maintain or update the dependency graph for each of the cells in the workbook to ensure that the dependency graph (and, thus, the corresponding lists) are complete and include the corresponding dependencies. In some embodiments, the dependencies for a cell can only be identified by parsing and evaluating the formula for the cell. For example, when the formula for the cell is a collection of layered pointers, the data management module 132 may identify the full list of dependencies (i.e., a full chain of layered or nested pointers for the cell) when parsing and evaluating the formula for the cell. Thus, when the formula for one of the cells includes one or more layered or nested components, the data management module 132 may traverse each layer when parsing and evaluating the formula to identity the corresponding value for the cell, thereby potentially identifying dependencies that were not already accounted for in the dependency graph or list for the cell. In some embodiments, the recalculation module 136 may replace the data management module 132 with respect to one or more of the processes or steps at (6) (for example, calculating the initial values for the cells in the workbook or updating the dependency and reverse dependency lists and graph). Thus, the data management module 132 or the recalculation module 136 may perform the multiple phases of the recalculation process, as described above.

Thereafter, or therewith, at (7), the evaluated or calculated values for the cells are stored in the workbook, for example in the workbook data store 124 for review, management, and/or modification by the owner or user via the application, as described herein. Furthermore, storing the cell information in the workbook data store 124 also includes the data management module 132 storing the dependency and reverse dependency information returned at (5) (if not stored by the dependency module 134) in the workbook data store 124. This may also include any updated dependency information identified at (6).

In some embodiments, the data management module 132 or the dependency module 134 may update the dependency or reverse dependency lists based on the formulas described above.

Figure 3B:
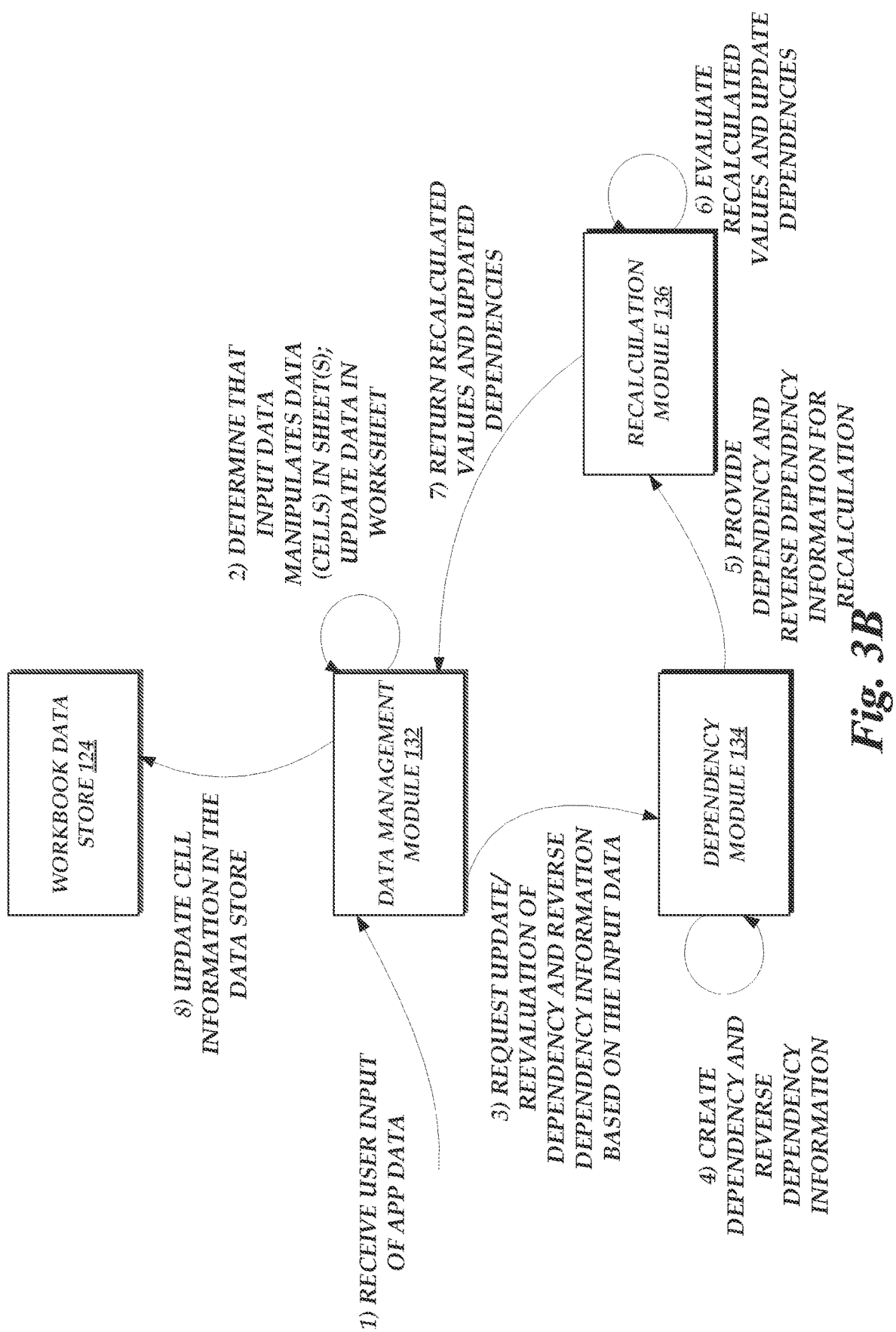

With reference to FIG. 3B, illustrative interactions will be described for updating an existing workbook with input data from the owner or user of the workbook, for example via the application associated therewith. Updating the existing workbook comprises updating the data stored in cells in the workbook and also updating corresponding values and dependency information, as described below. For purposes of FIG. 3B, it is assumed that the owner has previously established or created the workbook framework via the workbook system 120 or similar system such that the workbook already exists, is accessible by the owner or user, and is already populated with initial data.

With further reference to FIG. 3B, at (1), the application builder system 120 receives owner or user input of application data. The application data may be entered into the workbook directly by the owner or user via one of the client devices 102 or obtained/imported from a network accessible storage 108 of FIG. 1. The application data may include additional data being appended to existing data in the workbook (for example, that involves adding one or more columns or rows to a table in the workbook), deletion of data from the workbook (for example, that involves deleting one or more columns or rows from a table in the workbook), reformatting of data structures in the workbook, moving or renaming of data structures in the workbook, and so forth.

At (2), the data management module 132 determines whether the input data from (1) manipulates any data in the workbook, for example whether the input data results in a change to any of the cells in the workbook that would cause a need to recalculate values or other cell information for any of the cells of the workbook or review and revise the dependency information for any of the cells of the workbook. Furthermore, at (2) the data management module 132 updates data in the worksheet, for example using the workbook data store 124 to update cell information therein based on the input application data.

Therewith, or thereafter, at (3), the data management module 132 generates a request for the dependency module to generate dependency and reverse dependency lists and corresponding information based on the input application data from (1). The specifics of the request generated at (3) may identify specific cells for which the updated dependency or reverse dependency information is requested or may be a blanket request for all cells or a subset of cells in the workbook. For example, the data management module 132 may identify which cells are marked for updating based on the strategies or options described above. Where the owner or user input of application data at (1) was not the initial data for the workbook, then the request generated at (3) may comprise a request to update existing dependency and reverse dependency information and lists.

At (4), the dependency module 134 generates the dependency and reverse dependency information. The interaction at (4) in FIG. 3B is similar to the interaction (3) of FIG. 3A. Accordingly, for simplicity, the duplicate functionality will not be repeated here in its entirety. In some embodiments, generating the dependency information comprises severing existing links representing dependencies in the dependency graph. Such actions may not be performed with reference to FIG. 3A because the embodiment of FIG. 3A is not pre-populated and before (4) of FIG. 3A, there was no dependency or reverse dependency information to update in response to a change to data in the workbook. For example, as noted above, when the cell A1 has the cell formula A1=SUM(B2,C9), the cell A1 values is dependence on the cells B2 and C9. Thus, in the dependency graph described herein, links exist between the pair of cells A1 and B2 and the pair of cells A1 and C9. When generating the dependency and reverse dependency information at (4) in response to a change of the formula for the cell A1, the systems and methods may sever the links between the cells A1 and B2 and A1 and C9. The generating of the dependency information for the cell A1 following a change of the formula of the cell A1 (for example, to A1=B2 involves the re-establishing of the links in the dependency graph between A1 and B2 only. Thus, when the change to the cell formula for the cell A1 is detected (for example, based on received input data), the cell dependencies for the cell A1 are severed the dependency list for the cell A1. At (4), these dependency list for the cell A1 is repopulated for the cell A1 based on the change to the cell formula for the cell A1 such that the repopulated dependency list for the cell A1 identifies a value or cell identifier on which the cell A1 value depends, at least in part.

Furthermore, in some embodiments, the establishment of the updated reverse dependency list or graph occurs as a separate function or algorithm as the generating of the dependency information at (4). Accordingly, the updating of the dependency graph and the reverse dependency graph occurs as separate processes that can move up and down the graph independently.

At interaction (5) of FIG. 3B, the dependency module 134 may convey the generated dependency lists and reverse dependency lists to the recalculation module 136 for recalculation by the recalculation module 136. In some embodiments, though not shown in FIG. 3A, the dependency module 134 optionally conveys the generated or updated dependency lists and reverse dependency lists to the data management module 132 or to the workbook data store 124.

At (6), the recalculation module 136 may use the dependency lists and the reverse dependency lists to identify or recalculate values for each of the cells in the workbook and, thus, recalculate values for the workbook. For example, as described above with reference to (6) of FIG. 3A, identifying or calculating the initial values comprises calculating the initial values for the cell (and, accordingly, the workbook) based on the corresponding formula for the cell. In some embodiments, when evaluating or calculating the values for the cells (for example, updated cells or new cell due to the mutation), the recalculation module 134 can infer or identify dependencies for the respective cells and update the corresponding dependency graph based on the evaluation results. For example, similar to the description above, when evaluating the values for one of the cells, the recalculation module 134 may parse and evaluate the respective formula. As part of this parsing and evaluating of the formula, the data management module 132 may identify dependencies that are not in the dependency graph for the cell and update the dependency graph accordingly. Accordingly, at (6), the recalculation module 136 may help maintain or update the dependency graph for each of the cells in the workbook to ensure that the dependency graph (and, thus, the corresponding lists) are complete and include the corresponding dependencies. In some embodiments, as explained above, the dependencies for some cells can only be identified by parsing and evaluating the formula for the cell, for example, when the formula for the cell includes layered or nested features or components. Thus, when the formula for one of the cells includes the layered or nested features or components, the recalculation module 136 may traverse each layer or nested feature when parsing and evaluating the formula to identity the corresponding value for the cell. This parsing and traversing may identify dependencies that were not already accounted for in the dependency graph or list for the cell, which the recalculation module 136 may use to update the dependency lists and graphs. In some embodiments, the data management module 132 may replace the recalculation module 136 with respect to calculating the values for the cells in the workbook based on the dependency and reverse dependency lists and updating the dependency lists or graphs as noted above. In some embodiments, the calculated values may be replacement or updated values for the cells in the workbook. The recalculation module 136 may perform the multiple phases of the recalculation process, as described above.

Thereafter, or therewith, at (7), the evaluated or calculated values for the cells are conveyed to the data management module 132 or directly to the workbook data store 124 for storage in the workbook, for example in the workbook data store 124 for review, management, and/or modification by the owner or user via the application, as described herein. At (8), the data management module 132 updates cell information in the workbook data store 124 if not already passed or conveyed to the workbook data store 124.

In some embodiments, one or more of the interactions shown in FIGS. 3A and 3B may be modified to omit certain interactions or introduced certain other actions not currently shown.

Figure 4:
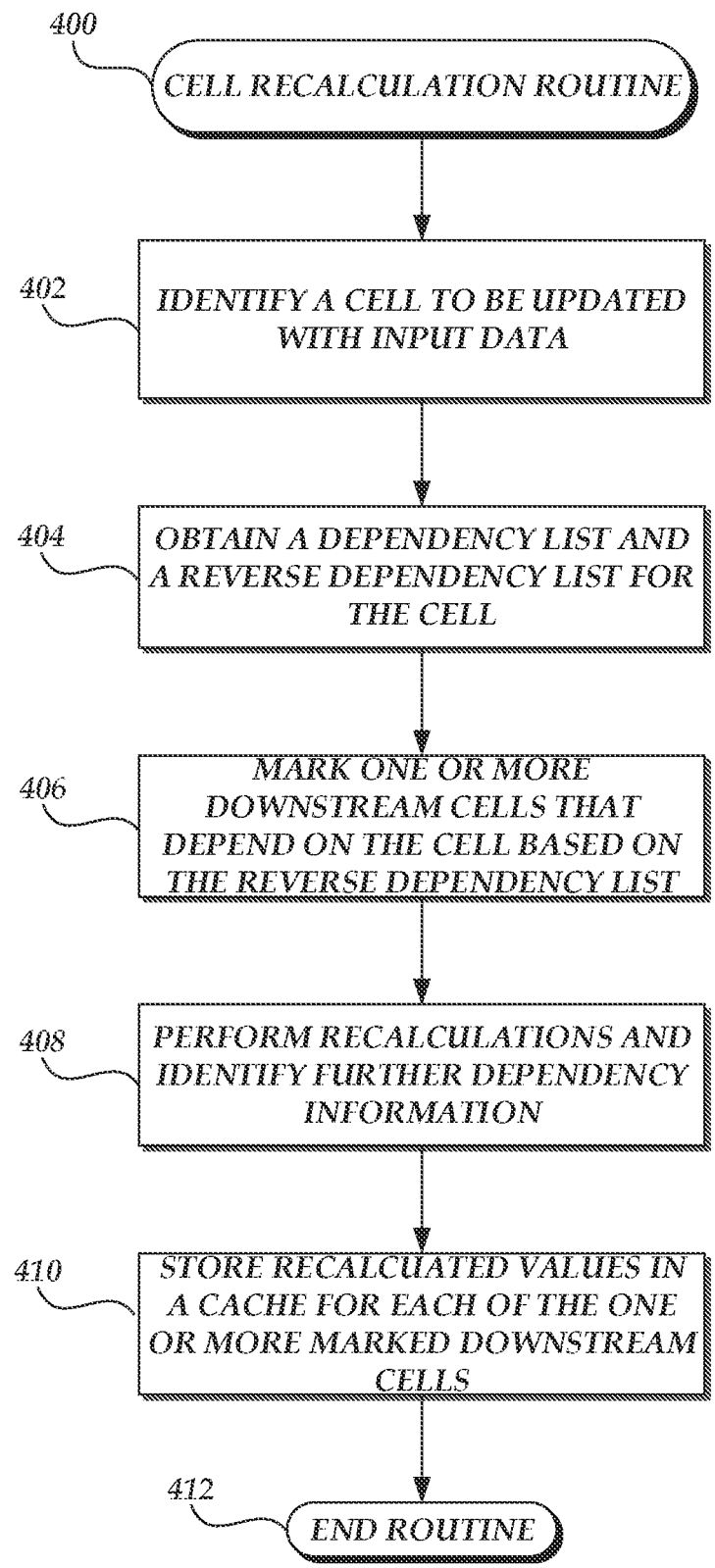
FIG. 4 is a flow chart depicting an illustrative routine for making updates to data in an application workbook and recalculating data in the workbook accordingly with the application system of FIG. 1.

With reference to FIG. 4, an illustrative routine 400 will be described for making updates to data in an application workbook and recalculating data in the workbook accordingly, in accordance with embodiments of the present disclosure. The routine 400 may be carried out, for example, by the computing environment 110.

The routine 400 begins at block 402, where the computing environment 110 (e.g., the workbook system 120 or the data management module 132) identifies a cell to be updated based on input data received, for example the input data (1) in FIGS. 3A and 3B. The input data may comprise structural changes, that is a change that results in a change to the structure of the workbook or to a formula for one of the cells in the workbook. In some embodiments, the input data may only change a subset of the data or cells in the workbook. Accordingly, at block 402, the data management module 132 may analyze the input data to determine which one or more cells of the workbook are updated based on the input data. This may involve identifying what data is being added to or deleted from the workbook and further determining (for example, from evaluating the dependency and reverse dependency lists for identified data and cells) how those changes impact other cells. Based on the identified cells, the routine 400 proceeds to block 404.

Thereafter, at block 404, the computing environment 110 (e.g., the data management module 132) obtains a dependency list and a reverse dependency list for the cell. In some embodiments, the computing environment 110 obtains the dependency list and the reverse dependency list as part of block 202 and the identification of cells to be updated. In some embodiments, obtaining the dependency and reverse dependency lists comprises generating the lists based on analyzing the formulas in the cells in the workbook and tracking the reverse dependencies while populating the workbook and reviewing all formulas in the workbook. In some embodiments, the computing environment 110 extracts the dependency and reverse dependency lists from or with the dependency module 136 or from the workbook data store 124. As described herein, the dependency and reverse dependency lists identify downstream cells that depend on the cell or upstream cells on which the cell depends.

Thereafter, at block 406, the computing environment 110 (e.g., the workbook system 120) marks one or more downstream cells that depend on the cell based on the reverse dependency list. In some embodiments, the computing environment 110 identifies the downstream cells that are to be updated based on the reverse dependency list. In some embodiments, marking the downstream cells further involves identifying and marking those cells that depend on the downstream cells.

Thereafter, at block 408, the computing environment 110 (e.g., the workbook system 120) performs recalculation on each of the one or more marked downstream cells (for example, via the recalculation module 136). As described herein, the recalculation process may comprise multiple phases, and a second phase involves recalculating marked cells and recursively recalculating cells that depend on the marked cells. Furthermore, as described above, recalculation (or initial calculation) of values comprises parsing and evaluating formulas. In some embodiments, when evaluating or calculating the values for the cells (for example, updated cells or new cells due to the mutation), the recalculation module 136 can infer or identify dependencies for the respective cells and update the corresponding dependency graph based on the evaluation results. Thus, the recalculation module 136 or the data management module 132 can identify additional dependencies that the dependency module 134 was unable to identify and update the dependency lists and graphs to include the new dependency information.

Thereafter, at block 410, the recalculated values for the cells are stored in a cache, for example by the computing environment 110 (e.g., the workbook updating service 130). Thus, any calculated marked cells need not be recalculated again even if referenced by another dependency list. Instead, the workbook updating service 130 can reference the cache and use the recalculated value stored therein, saving processing time. Furthermore, at block 410, the recalculated values for the cells can be stored in a persistent memory (for example, the workbook data store 124) after being stored in the cache, in addition to be stored in the cache, or instead of being stored in the cache.

Much of the discussion above focuses on recalculation algorithms that recalculate cell information (for example, cell values, cell formulas, and cell dependency and reverse dependency lists) based on changes to one or more other cells in the workbook. Such algorithms may equally apply to any other data type or structure according to which data is stored in the workbook. For example, such algorithms may equally to tabular data stored in the workbook and that represents a table.

In some embodiments, the computing environment 110 (for example, via data management module 132) may enable filter functions for data stored in the workbook data store 124 for the workbook. Filter functions allow the owner or users to filter down tabular data of the workbook and allows the owner or users to view a subset of the tabular data according to the applied filter functions (for example, as related to a particular context). For example, the owner or users can apply filter functions to the tabular data in the workbook to identify items that were added to the workbook in a specified period of time or items that are owned by or associated with a particular user.

The filter functions may have a particular format that identifies a target table and supplemental arguments, for example query criteria to apply to the table. For example, a filter function to apply to a data table having a column named color and to identify only data rows having the color red may identify the table "A", the column "color", and the value of interest, "red" in a particular syntax or format. When data in the table changes, the results of the filter function may also change. Accordingly, when the data management module 132 applies one or more of the recalculation strategies described above with respect to the dependency and reverse dependency graphs, the filter functions may not be appropriately recalculated based on changes to the underlying tabular data to which the filter function is applied.

In prior systems, the filter functions would be recalculated with any change in the table. However, as a number of filter functions increases in the table, the processing resources associated with recalculating the filter functions for any table change (as compared to just table changes that impact the filter function) increase and become detrimental to owner and user use of the workbook. For example, the algorithm where the cell A1=SUM(B1:B1000) and any change to the column B would result in A1 being recalculated does not apply as nicely tabular data. For example, recalculating all filter functions that apply to a table any time that tabular data associated with the table is changed results in more recalculations of the filters because the table may include a large number of filter functions, which increases recalculation time and resource demand. Instead, the optimization algorithm for tabular data and filter functions that apply thereto may recalculate the filter functions only when a cell inside the column of interest changes (for example, a cell inside the color column of the example above) and when the change of that cell pertains to the value of interest (for example, cell inside the color column changes to or from the color red). The optimization algorithm may limit the recalculations to only changes involving values of interest by generating partitions of the tabular data based on the filter functions of interest in the table (or corresponding spreadsheet) as opposed to generating all possible partitions in the tabular data. For example, with the column color red filter function proposed above, the optimization algorithm may identify possible partitions in the tabular data on the color column where the value is red. Thus, the partition may be defined by the elements of the filter function. The partition of the optimization algorithm may then be applied to determine whether the partition needs to be marked for recalculation based on what tabular data is changing. For example, in the column color filter function above, if input data changes some of the tabular data and, more specifically, changes data in the color column by changing one of the cells from red to green, then the data management module 132 may determine that a cell of the red color partition was changed because it went from red to green. Similarly, if the input data changes a cell inside the color column from green to red, the data management module 132 may determine that this change falls into the partition identified by the optimized algorithm. Accordingly, the data management module 132 may determine that all filter functions (for example, functions) that apply to or depend on that partition (for example, the red color column partition) need to be recalculated. Effectively, the data management module 132 applying the optimized algorithm detects mutations in the data table and infers what partitions changed as a result of the mutation. The data management module 132 then recalculates all filters that applied to or were linked to the partitions that changed as a result of the mutation to the data table, regardless of whether the change changed the data to a value of interest or from a value of interest. Thus, the data management module 132 infers the possible partitions in the data table using the filter function criteria.

In some embodiments, the data management module 132 may parse formula information provided in the input data (for example, a cell formula and the like). When parsing the formula, the data management module 132 may create an abstract data graph or tree orbit showing relationships between elements in the formula. For example, when the formula is for cell B2 and is B2=SUM(A1:A3), the data management module 132 may parse the formula to identify that B2 is based on A1, A2, and A3 (which may be shown by a representative graph having a node B1 coupled to nodes A1, A2, and A3, which represents the dependency of B1 on A1, A2, and A3. Additionally, the data management module 132 also identifies from parsing this formula that A1, A2, and A3 have reverse dependencies, namely B1, which depends on A1, A2, and A3. Thus, the data management module 132 generates the reverse dependency list for cell A3 to indicate that the cell B1 depends on A3. Accordingly, edges between the nodes A3 and B1 may also exist for the reverse dependency indication. Accordingly, if any of the values of A1, A2, and A3 change, the data management module 132 may quickly determine that the cell B1 needs to be updated accordingly.

Furthermore, while the discussion herein generally describes analysis of and recalculation of like entities (for example, cells with cells, tabular data with tabular functions, and so forth), different kinds of entities can have dependency (or reverse dependency) on different entities. For example, a change to a cell in the workbook could have a corresponding recalculation effect on a filter function that applies to a data table that references the changed cell, and so forth. Furthermore, while many embodiments described herein employ the data management module 132 of the computing environment 110, any component of the computing environment 110, or multiple components, could perform the respective actions described herein.

In some embodiments, Tables 1a-8b provide examples of dependency and reverse dependency information stored or saved in the cell information for different cells. The Tables 1a-1c apply to cells where the cell formula is E18=SUM (B2,C9). The tables 2a-2b apply to cells where the cell formula is E18=SUM(B2:B20). The tables 3a-3d apply to cells where the cell formula is E18=SUM(B2:D9). The tables 4a-4b apply to cells where the cell formula is E18=SUM(B:B). The tables 5a-5b apply to cells where the cell formula is E18=SUM(B:D). The tables 6a-6b apply to cells where the cell formula is E18=SUM(7:7). The tables 7a-7b apply to cells where the cell formula is E18=SUM(7: 9). The tables 8a-8b apply to cells where the cell formula is E18=rel:row:table_id/row_id.

TABLE 1a

| E18 = SUM(B2, C9) | |
|---|---|
| Cell Reference, E18 | |
| Formula | SUM(B2, C9) |
| Value | ... |
| Formatted Value | ... |
| Style | ... |
| Parsed Expression | Root node |
| Dependencies | B2, C9 |
| Reverse Dependencies | None |

TABLE 1b

| Cell Reference, B2 | |
|---|---|
| Formula | ... |
| Value | ... |
| Formatted Value | ... |
| Style | ... |

TABLE 1b-continued

| Cell Reference, B2 | |
|---|---|
| Parsed Expression | Root node |
| Dependencies | ... |
| Reverse Dependencies | E18 |

TABLE 1c

| Cell Reference, C9 | |
|---|---|
| Formula | ... |
| Value | ... |
| Formatted Value | ... |
| Style | ... |
| Parsed Expression | Root node |
| Dependencies | ... |
| Reverse Dependencies | E18 |

TABLE 2a

| E18 = SUM(B2:B20) | |
|---|---|
| Cell Range Reference, El8 | |
| Formula | SUM(B2:B20) |
| Value | ... |
| Formatted Value | ... |
| Style | ... |
| Parsed Expression | Root node |
| Dependencies | Column B |
| Reverse Dependencies | None |

TABLE 2b

| Cell Range Reference, Column B | |
|---|---|
| Formula | ... |
| Value | ... |
| Formatted Value | ... |
| Style | ... |
| Parsed Expression | ... |
| Dependencies | ... |
| Reverse Dependencies | E18 |

TABLE 3a

| E18 = SUM(B2:D9) | |
|---|---|
| 2-D Cell Range Reference, E18 | |
| Formula | SUM(B2:D9) |
| Value | ... |
| Formatted Value | ... |
| Style | ... |
| Parsed Expression | Root node |
| Dependencies | Column B, Column C, Column D |
| Reverse Dependencies | None |

TABLE 3b

| 2-D Cell Range Reference, Column B | |
|---|---|
| Formula | ... |
| Value | ... |
| Formatted Value | ... |
| Style | ... |
| Parsed Expression | ... |
| Dependencies | ... |
| Reverse Dependencies | E18 |

TABLE 3c

2-D Cell Range Reference, Column C

| | |
|---|---|
| Formula | . . . |
| Value | . . . |
| Formatted Value | . . . |
| Style | . . . |
| Parsed Expression | . . . |
| Dependencies | . . . |
| Reverse Dependencies | E18 |

TABLE 3d

2-D Cell Range Reference, Column D

| | |
|---|---|
| Formula | . . . |
| Value | . . . |
| Formatted Value | . . . |
| Style | . . . |
| Parsed Expression | . . . |
| Dependencies | . . . |
| Reverse Dependencies | E18 |

TABLE 4a

E18 = SUM(B:B)
Column Range Reference, E18

| | |
|---|---|
| Formula | SUM(B:B) |
| Value | . . . |
| Formatted Value | . . . |
| Style | . . . |
| Parsed Expression | Root node |
| Dependencies | Column B |
| Reverse Dependencies | None |

TABLE 4b

Column Range Reference, Column B

| | |
|---|---|
| Formula | . . . |
| Value | . . . |
| Formatted Value | . . . |
| Style | . . . |
| Parsed Expression | . . . |
| Dependencies | . . . |
| Reverse Dependencies | E18 |

TABLE 5a

E18 = SUM(B:D)
2-D Column Range Reference, E18

| | |
|---|---|
| Formula | SUM(B:D) |
| Value | . . . |
| Formatted Value | . . . |
| Style | . . . |
| Parsed Expression | Root node |
| Dependencies | Column B, Column C, Column D |
| Reverse Dependencies | None |

TABLE 5b

2-D Column Range Reference, Column B/Column C/Column D

| | |
|---|---|
| Formula | . . . |
| Value | . . . |
| Formatted Value | . . . |
| Style | . . . |

TABLE 5b-continued

2-D Column Range Reference, Column B/Column C/Column D

| | |
|---|---|
| Parsed Expression | . . . |
| Dependencies | . . . |
| Reverse Dependencies | E18 |

TABLE 6a

E18 = SUM(7:7)
Row Reference, E18

| | |
|---|---|
| Formula | SUM(7:7) |
| Value | . . . |
| Formatted Value | . . . |
| Style | . . . |
| Parsed Expression | Root node |
| Dependencies | Row 7 |
| Reverse Dependencies | None |

TABLE 6b

Row Reference, Row 7

| | |
|---|---|
| Formula | . . . |
| Value | . . . |
| Formatted Value | . . . |
| Style | . . . |
| Parsed Expression | . . . |
| Dependencies | . . . |
| Reverse Dependencies | E18 |

TABLE 7a

E18 = SUM(7:9)
Row Range Reference, E18

| | |
|---|---|
| Formula | SUM(7:9) |
| Value | . . . |
| Formatted Value | . . . |
| Style | . . . |
| Parsed Expression | Root node |
| Dependencies | Row 7, Row 8, Row 9 |
| Reverse Dependencies | None |

TABLE 7b

Row Range Reference, Row 7/Row 8/Row 9

| | |
|---|---|
| Formula | . . . |
| Value | . . . |
| Formatted Value | . . . |
| Style | . . . |
| Parsed Expression | . . . |
| Dependencies | . . . |
| Reverse Dependencies | E18 |

TABLE 8a

E18 = rel:row:table_id/row_id
Rowlinks, E18

| | |
|---|---|
| Formula | rel:row:table_id/row_id |
| Value | . . . |
| Formatted Value | . . . |
| Style | . . . |

TABLE 8a-continued

E18 = rel:row:table_id/row_id
Rowlinks, E18

| Parsed Expression | Root node |
|---|---|
| Dependencies | rel:table_id/row_id |
| Reverse Dependencies | None |

TABLE 8b

Rowlinks, Table Row

| Formula | ... |
|---|---|
| Value | ... |
| Formatted Value | ... |
| Style | ... |
| Parsed Expression | ... |
| Dependencies | ... |
| Reverse Dependencies | E18 |

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing data associated with an application, the system comprising:
    a data store including a workbook comprising a plurality of cells related to the application, wherein the workbook stores cell information for each of the plurality of cells, the plurality of cells comprising a first cell, a second cell, and a third cell, the first cell corresponding to a first cell identifier and comprising a first cell value, the second cell corresponding to a second cell identifier and comprising a second cell value, the third cell corresponding to a third cell identifier and comprising a third cell value; and
    one or more processors configured to execute instructions stored in memory to:
        populate, in the data store:
            a forward dependency list for the first cell, the forward dependency list identifying a range of cell identifiers for a range of cells, the range of cells comprising the second cell based on the first cell value depending, at least in part, on the second cell value, and
            a reverse dependency list for the first cell, the reverse dependency list identifying the third cell identifier based on the third cell value depending, at least in part, on the first cell value;
        detect a change to a first cell formula for the first cell based on received input data;
        based on the detected change to the first cell formula:
            sever dependencies in the forward dependency list, and
            repopulate the forward dependency list such that the repopulated forward dependency list identifies at least one additional cell value on which the first cell value depends at least in part;
        detect an addition of a fourth cell to the range of cells;
        based on the repopulated forward dependency list and the addition of the fourth cell to the range of cells, detect a change to the first cell value;
        based on the detected change to the first cell value, mark the third cell for recalculation based on the reverse dependency list identifying the third cell identifier; and
        for each marked cell:
            perform recalculation on the marked cell,
            perform recalculation recursively on one or more cells that depend, at least in part, on the marked cell, and
            store recalculated cell values.

2. The system of claim 1, wherein the cell information for each of the plurality of cells comprises, for each of the plurality of cells one or more of a respective cell identifier, cell formula, cell value, forward dependency list, or reverse dependency list.

3. The system of claim 1, wherein the range of cells further comprises one or more additional cells of the plurality of cells based on the first cell value further depending, at least in part, on a corresponding cell value of each of the one or more additional cells.

4. The system of claim 1, wherein the forward dependency list is generated based on the first cell formula, and wherein the first cell formula comprises the second cell identifier.

5. The system of claim 1, wherein the reverse dependency list further identifies one or more additional cells of the plurality of cells based on each of the one or more additional cells comprising a corresponding cell value that depends, at least in part, on the first cell value.

6. The system of claim 1, wherein the one or more processors are further configured to execute the instructions stored in the memory to store the forward dependency list and the reverse dependency list in the cell information for the first cell.

7. The system of claim 1, wherein the first cell is linked to the second cell and the third cell in the workbook, wherein the first cell corresponds to a first node in a graph structure, the second cell corresponds to a second node in the graph structure, and the third cell corresponds to a third node in the graph structure, wherein a link between the first node and the second node represents a forward dependency of the first node and a link between the first node and the third node represents a reverse dependency of the first node.

8. The system of claim 1, wherein performing recalculation recursively on one or more cells that depend on the marked cell comprises parsing a cell formula of the marked cell to identify one or more dependencies for the marked cell and updating a second forward dependency list for the marked cell based on the identified one or more dependencies.

9. A computer-implemented method comprising:
obtaining a forward dependency list for a first cell of a plurality of cells in a workbook, the forward dependency list identifying a range of cells based on a first cell value of the first cell depending, at least in part, on one or more cell values of the range of cells;
obtaining a reverse dependency list for the first cell, the reverse dependency list identifying at least one second cell in the workbook based on the at least one second cell value of the at least one second cell depending, at least in part, on the first cell value;
detecting an addition of a third cell to the range of cells;
identifying, in the workbook, the first cell for a first update based on a change to first cell information associated with the first cell and stored in the workbook, wherein the change is based on the forward dependency list and the addition of the third cell to the range of cells;
marking the at least one second cell for a second update based on identifying the first cell for the first update;
performing a recalculation process on the marked at least one second cell based on an identification that the first cell is updated based on input data;
generating a recalculated value for the marked at least one second cell based on performing the recalculation process on the marked at least one second cell; and
storing the recalculated value for the marked at least one second cell.

10. The method of claim 9, wherein the first cell information comprises a dynamic cell value for the first cell.

11. The method of claim 9, further comprising generating the forward dependency list, wherein the range of cells includes one or more additional cells of the plurality of cells based on the first cell value further depending, at least in part, on a corresponding cell value of each of the one or more additional cells.

12. The method of claim 11, wherein the forward dependency list is generated based on a first cell formula for the first cell, and wherein the first cell formula comprises one or more cell identifiers for the one or more additional cells.

13. The method of claim 9, wherein the reverse dependency list further identifies one or more additional cells of the plurality of cells based on each of the one or more additional cells comprising a corresponding cell value that depends, at least in part, on the first cell value.

14. The method of claim 9, wherein marking the at least one second cell for the second update comprises:
marking the at least one second cell for recalculation; and
marking one or more rows and one or more columns for recalculation, the one or more rows and the one or more columns comprising the marked at least one second cell.

15. The method of claim 14, further comprising:
performing recalculation recursively on a fourth cell that depends, at least in part, on the marked at least one second cell to generate a recalculated cell value for the fourth cell; and
storing the recalculated cell value.

16. The method of claim 15, wherein performing the recalculation recursively on the fourth cell comprises:
parsing a cell formula of the marked at least one second cell to identify one or more dependencies for the marked at least one second cell; and
updating a second forward dependency list for the marked at least one second cell based on the identified one or more dependencies.

17. A system for managing data associated with an application, the system comprising:
a data store including a workbook comprising a plurality of cells related to the application, wherein the workbook stores cell information for each of the plurality of cells, the plurality of cells comprising a first cell and a second cell, the first cell corresponding to a first cell identifier and comprising a first cell value, the second cell corresponding to a second cell identifier and comprising a second cell value; and
one or more processors configured to execute instructions stored in memory to:
populate, in the data store:
a reverse dependency list for the first cell, the reverse dependency list identifying the second cell identifier based on the second cell value depending, at least in part, on the first cell value, and
a forward dependency list for the first cell, the forward dependency list identifying a range of cell identifiers for a range of cells based on the first cell value depending, at least in part, on one or more cell values of the range of cells;
detect an addition of a third cell to the range of cells;
based on the forward dependency list and the addition of the third cell to the range of cells, detect a change to the cell information for the first cell; and
based on the detected change to the cell information for the first cell:
mark the second cell for recalculation based on identification of the second cell identifier in the reverse dependency list and the detected change to the cell information for the first cell, and
mark one or more rows and one or more columns for recalculation, the one or more rows and the one or more columns comprising the marked second cell.

18. The system of claim 17, wherein the range of cells comprises a fourth cell of the plurality of cells, wherein the third cell comprises a third cell value and the fourth cell comprises a fourth cell value, and wherein the first cell value depends, at least in part, on a sum of the third cell value and the fourth cell value.

19. The system of claim 18, wherein the one or more processors are further configured to execute the instructions to:

determine that the fourth cell does not exist in the data store;

create generate a placeholder cell for the fourth cell in the data store; and populate a second reverse dependency list for the placeholder cell, the second reverse dependency list identifying the first cell identifier.

20. The system of claim 17, wherein the one or more processors are further configured to execute the instructions to:

for each marked cell:
  perform recalculation on the marked cell,
  perform recalculation recursively on a fourth cell that depends, at least in part, on the marked cell to generate a recalculated cell value for the fourth cell, and
  store the recalculated cell value.

21. The system of claim 17, wherein the one or more processors are further configured to execute the instructions to:

parse a cell formula of each marked cell to identify one or more dependencies for each marked cell; and update a second forward dependency list for each marked cell based on the identified one or more dependencies.

22. The system of claim 17, wherein the reverse dependency list excludes a fourth cell identifier for a fourth cell of the plurality of cells based on the fourth cell comprising a fourth cell value that does not depend on the first cell value, wherein, based on the reverse dependency list excluding the fourth cell identifier, the fourth cell is not evaluated for marking based on the detected change to the cell information for the first cell.

* * * * *